US009053061B2

(12) United States Patent
James et al.

(10) Patent No.: US 9,053,061 B2
(45) Date of Patent: Jun. 9, 2015

(54) RESTORE MANAGER

(75) Inventors: Martyn Roland James, Westwood, MA (US); Andrew Peter Brown, Glasgow (GB); Jessica Ann Mcisaac, Boston, MA (US); Michael Edward Stapp, Westford, MA (US); Robert Ian Morgan, North Andover, MA (US)

(73) Assignee: Carbonite, Inc., Boston, MA (US)

( * ) Notice: Subject to any disclaimer, the term of this patent is extended or adjusted under 35 U.S.C. 154(b) by 0 days.

(21) Appl. No.: 13/639,086

(22) PCT Filed: Apr. 7, 2010

(86) PCT No.: PCT/US2010/030176
§ 371 (c)(1),
(2), (4) Date: Oct. 2, 2012

(87) PCT Pub. No.: WO2011/126478
PCT Pub. Date: Oct. 13, 2011

(65) Prior Publication Data
US 2013/0066839 A1    Mar. 14, 2013

(51) Int. Cl.
*G06F 17/30* (2006.01)
*G06F 11/14* (2006.01)

(52) U.S. Cl.
CPC ........ *G06F 11/1464* (2013.01); *G06F 11/1456* (2013.01); *G06F 11/1469* (2013.01)

(58) Field of Classification Search
CPC ............ G06F 11/1469; G06F 11/1458; G06F 11/1448
USPC .......................................................... 707/679
See application file for complete search history.

(56) References Cited

U.S. PATENT DOCUMENTS

| 6,865,655 | B1 * | 3/2005 | Andersen ............... 707/999.202 |
| 2002/0147938 | A1 | 10/2002 | Hamilton et al. |
| 2002/0156921 | A1 * | 10/2002 | Dutta et al. ................... 709/246 |
| 2006/0230081 | A1 | 10/2006 | Craswell et al. |
| 2007/0294320 | A1 | 12/2007 | Yueh et al. |
| 2008/0243959 | A1 * | 10/2008 | Bacastow et al. ............. 707/204 |
| 2010/0030754 | A1 * | 2/2010 | Petruzzo ........................... 707/3 |
| 2010/0031058 | A1 * | 2/2010 | Kito et al. ...................... 713/193 |
| 2010/0052843 | A1 * | 3/2010 | Cannistraro ................. 340/3.32 |
| 2010/0210240 | A1 * | 8/2010 | Mahaffey et al. ............. 455/411 |
| 2010/0313018 | A1 * | 12/2010 | Jorgensen ..................... 713/168 |
| 2011/0083088 | A1 * | 4/2011 | Cisler et al. ................... 715/763 |
| 2011/0246427 | A1 * | 10/2011 | Modak et al. ................. 707/653 |

OTHER PUBLICATIONS

International Search Report on PCT/US2010/030176 dated Dec. 28, 2010.
Written Opinion on PCT/US2010/030176 dated Dec. 28, 2010.

* cited by examiner

*Primary Examiner* — Rehanna Perveen
*Assistant Examiner* — Tiffany Thuy Bui
(74) *Attorney, Agent, or Firm* — Foley and Lardner LLP; John D. Lanza

(57) ABSTRACT

The restore of user data techniques include a method, a system, a device and/or a computer program product. In some embodiments of these techniques, the method includes receiving user selection for restoring backed up user data to a client device. The method further includes receiving backed up user data from a server based on the user selection. The method further includes determining file location for a file in the received backed up user data based on the user selection and a parameter associated with the client device. This Abstract is provided for the sole purpose of complying with the Abstract requirement rules. This Abstract is submitted with the explicit understanding that it will not be used to interpret or to limit the scope or the meaning of the claims.

11 Claims, 26 Drawing Sheets

FIG. 13D

Carbonite Restore Report

Report for files restored on 1/29/2010 at 10:17:43 AM

Overview

* Carbonite successfully restored 10 files (80 MB). View files.

File Details

Restored files:

| File Name | Old Location | New Location |
|---|---|---|
| :#Mine.txt | C:\Back Me Up | C:\Back Me Up |
| Another ; one of these (Restored) 07-13-2009 13.12.txt | C:\Back Me Up | C:\Back Me Up |
| Another ; one of these (Restored) 11-24-2009 17.03.txt | C:\Back Me Up | C:\Back Me Up |
| Another ; one of these.txt | C:\Back Me Up | C:\Back Me Up |
| CarboniteService.pdb | C:\Back Me Up | C:\Back Me Up |
| Duplicate.bat | C:\Back Me Up | C:\Back Me Up |
| FORCE | C:\Back Me Up | C:\Back Me Up |
| Martyn.docx | C:\Back Me Up | C:\Back Me Up |
| Win7 Test File.txt | C:\Back Me Up | C:\Back Me Up |
| Back This up.txt | C:\Back Me Up\WC2420 | C:\Back Me Up\WC2420 |

Print Report 1300e
1395
1385
1390

FIG. 13E

RESTORE MANAGER

RELATED APPLICATIONS

The present application claims priority to and is a national phase entry under 35 U.S.C. §371 of co-pending International Application No. PCT/US2010/030176 entitled "Restore Manager," filed Apr. 7, 2010 and designating the United States, the entirety of which is hereby incorporated by reference.

FIELD OF THE INVENTION

The present invention relates generally to computer-based methods and apparatuses, including computer program products, for restoring user data that was backed up.

BACKGROUND OF THE INVENTION

Computer systems are ubiquitous in today's work and home environments. The data stored on these computer, systems, however, is vulnerable to theft, fire, flood, and other natural disasters. A data storage system is needed to support a backup and restore system for a large number of client computing devices. Multiple data centers may be employed to store user data backups. A user may backup user data from a computing device. The user may want to restore the backed up user data to the same or another computing device. The computing devices may be running different operating systems. Thus, a need exists for a system that restores backed up user data to correct locations on the computing device. Also, a need exists for a restore system that allows users to easily customize the restore process.

SUMMARY OF THE INVENTION

One approach to restoring backed up user data is a method. The method includes receiving user selection for restoring backed up user data to a client device. The method further includes receiving backed up user data from a server based on the user selection. The method further includes determining file location for a file in the received backed up user data based on the user selection and a parameter associated with the client device.

Another approach to restoring backed up user data is a method. The method includes providing a user interface for requesting restoring backed up user data to a client device. The method further includes receiving a restore selection from the user, the restore selection including a selection of a source client device to restore the backed up user data from, and a client device user selection. The method further includes requesting backed up user data from a server based on the user selection.

Another approach to restoring backed up user data is a device that includes a processor and a memory that includes processor executable code. The processor executable code, when executed by the processor, configures the device to receive user selection for restoring backed up user data to a client device. The device is further configured to receive backed up user data from a server based on the user selection. The device is further configured to determine file location for a file in the received backed up user data based on the user selection and a parameter associated with the client device.

Another approach to restoring backed up user data is a device that includes a processor and a memory that includes processor executable code. The processor executable code, when executed by the processor, configures the device to provide a user interface for requesting restoring backed up user data to a client device. The device is further configured to receive a restore selection from the user, the restore selection including a selection of a source client device to restore the backed up user data from, and a client device user selection. The device is further configured to request backed up user data from a server based on the user selection.

Another approach to restoring backed up user data is a computer program product that is embodied on a computer-readable medium. The computer program product includes program code for receiving user selection for restoring backed up user data to a client device. The computer program product further includes program code for receiving backed up user data from a server based on the user selection. The computer program product further includes program code for determining file location for a file in the received backed up user data based on the user selection and a parameter associated with the client device.

Another approach to restoring backed up user data is a system. The system includes means for receiving user selection for restoring backed up user data to a client device. The system further includes means for receiving backed up user data from a server based on the user selection. The system further includes means for determining file location for a file in the received backed up user data based on the user selection and a parameter associated with the client device.

Another approach to restoring backed up user data is a system. The system includes means for providing a user interface for requesting restoring backed up user data to a client device. The system further includes means for receiving a restore selection from the user, the restore selection including a selection of a source client device to restore the backed up user data from, and a client device user selection. The system further includes means for requesting backed up user data from a server based on the user selection.

BRIEF DESCRIPTION OF THE DRAWINGS

Various embodiments taught herein are illustrated by way of example, and not by way of limitation, in the figures of the accompanying drawings, in which:

FIGS. 13A-E illustrate exemplary interfaces related to restoring user data to a client device.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
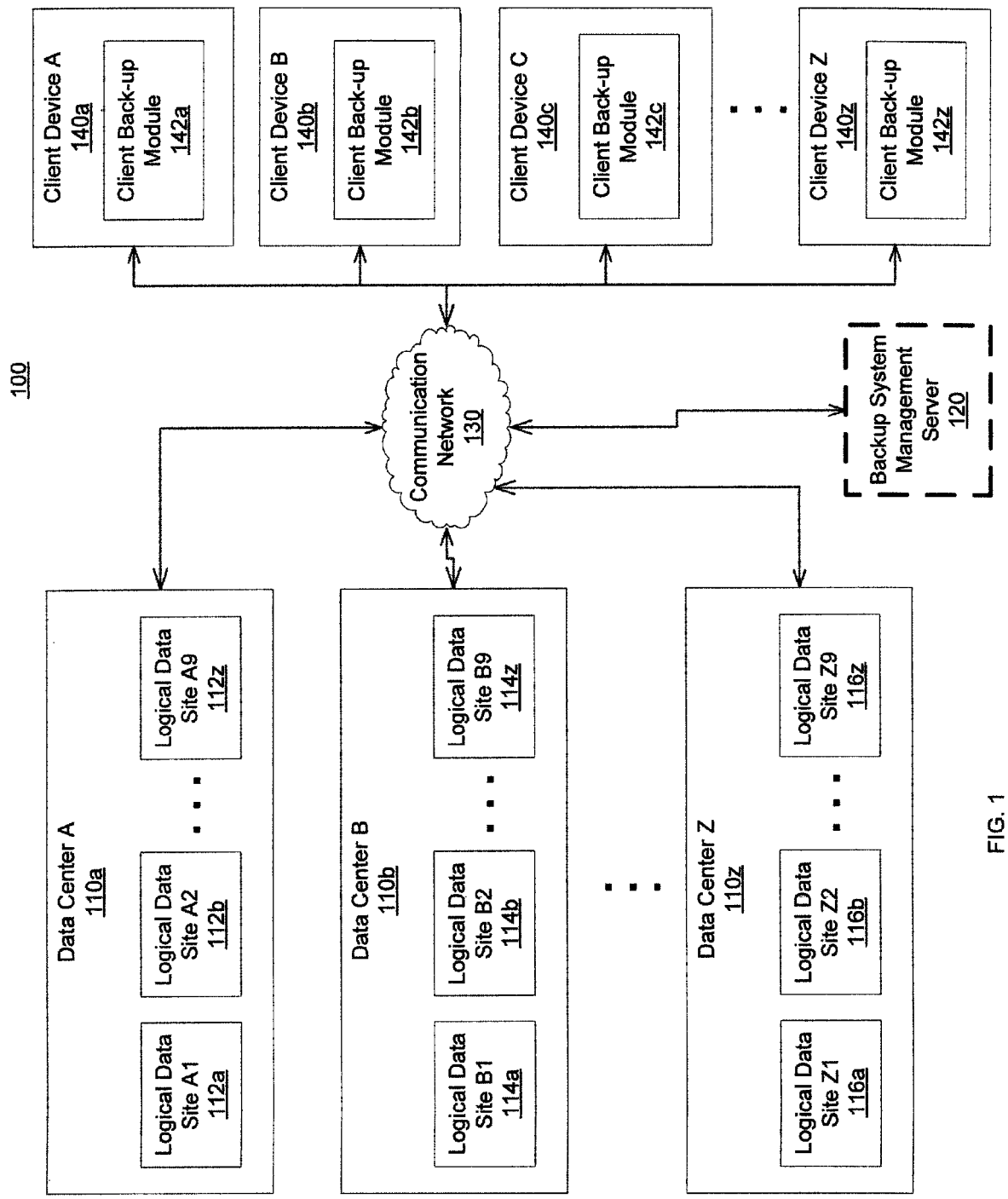
FIG. 1 is a block diagram illustrating an exemplary system, according to one exemplary embodiment.

FIG. 1 illustrates an exemplary system 100 for backup and restoration of user data (e.g., one or more document files, one or more audio files, etc.) between client devices A 140*a*, B 140*b*, C 140*c* through Z 140*z* (e.g., personal computer, server computing system, personal digital assistant, phone, music player, etc.) and data centers A 110*a*, B 110*b* through Z 110*z* (e.g., server systems with a plurality of data storage devices, server systems connected to a plurality of network data storage devices, etc.). The system 100 includes a communication network 130 (e.g., internet protocol (IP) network, a local area network (LAN), interne, etc.) and a backup system management server 120.

Each data center A 110*a*, B 110*b* through Z 110*z* includes a plurality of logical data sites 1, 2 through 9, 112*a*, 112*b* through 112*z*, 114*a*, 114*b* through 114*z*, and 116*a*, 116*b*, through 116*z*, respectively. Each client device A 140*a*, B 140*b*, C 140*c* through Z 140*z* includes a client backup module 142*a*, 142*b*, 142*c*, through 142*z*, respectively. The data centers 110*a*-110*z*, the client devices 140*a*-140*z*, and/or the backup system management server 120 communicate via the communication network 130.

The backup system management server 120 can manage the backup of user data from the client devices 140*a*-140*z* to one or more of the logical data sites at one or more of the data centers 110*a*-110*z*. The backup system management server 120 can manage the restoration of user data from one or more of the logical data sites at one or more of the data centers 110*a*-110*z* to the client devices 140*a*-140*z*. The backup system management server 120 can communicate with the client backup module 142*a*-142*z* on each client device 140*a*-140*z* to manage the backup and/or restoration of the user data (e.g., pause backup, start backup, select backup set, start restoration, schedule backup, communicate a backup policy, update a backup set, etc.). In some embodiments, the client devices 140*a*-140*z* manage the backup and restoration of the user data. In these embodiments, the backup system management server 120 dispatches connections from the client devices 140*a*-140*z* to a data center server (e.g., data center management server, site management server, etc.).

In some examples, the restoration of the user data is to the originating client device (e.g., the client device from which the user data originated from, the client device connected to the computing device which the user data originated from etc.). In other examples, the restoration of the user data is to another client device that is not the originating client device (e.g., new user computer, etc.).

In other examples, each data center 110*a*-110*z* includes a data center management server (not shown) for managing the backup and/or the restoration of the user data. In some examples, each logical site includes a site management server for managing the backup and/or the restoration of the user data. In other examples, the backup system management server 120 manages the backup and/or the restoration of the user data by managing one or more of the data center management servers and/or one or more of the site management servers.

Although FIG. 1 illustrates a single communication network 130, the system can include a plurality of communication networks and/or the plurality of communication networks can be configured in a plurality of ways (e.g., a plurality of interconnected local area networks (LAN), a plurality of interconnected wide area network (WAN), a plurality of interconnected LANs and/or WANs, etc.). In other embodiments, the user data is backed up locally on the client devices 142*a*-142*z*.

Although FIG. 1 illustrates the data centers A 110*a*, B 110*b* through Z 110*z*, the logical data sites 1, 2 through 9 (e.g. 112*a*-112*z*), and the client device A 140*a*, B 140*b*, C 140*c* through Z 140*z*, the system 100 can include any number of data centers, logical data sites, and/or client devices. In some examples, data centers A, B, and C include ten logical data sites and data centers D, E, F, and G include twenty logical data sites. In other examples, ten thousand client devices are associated with each logical data site. In this example, data center G is associated with two hundred thousand client devices since data center G includes twenty logical data sites and each logical data site is associated with ten thousand client devices.

Figure 2:
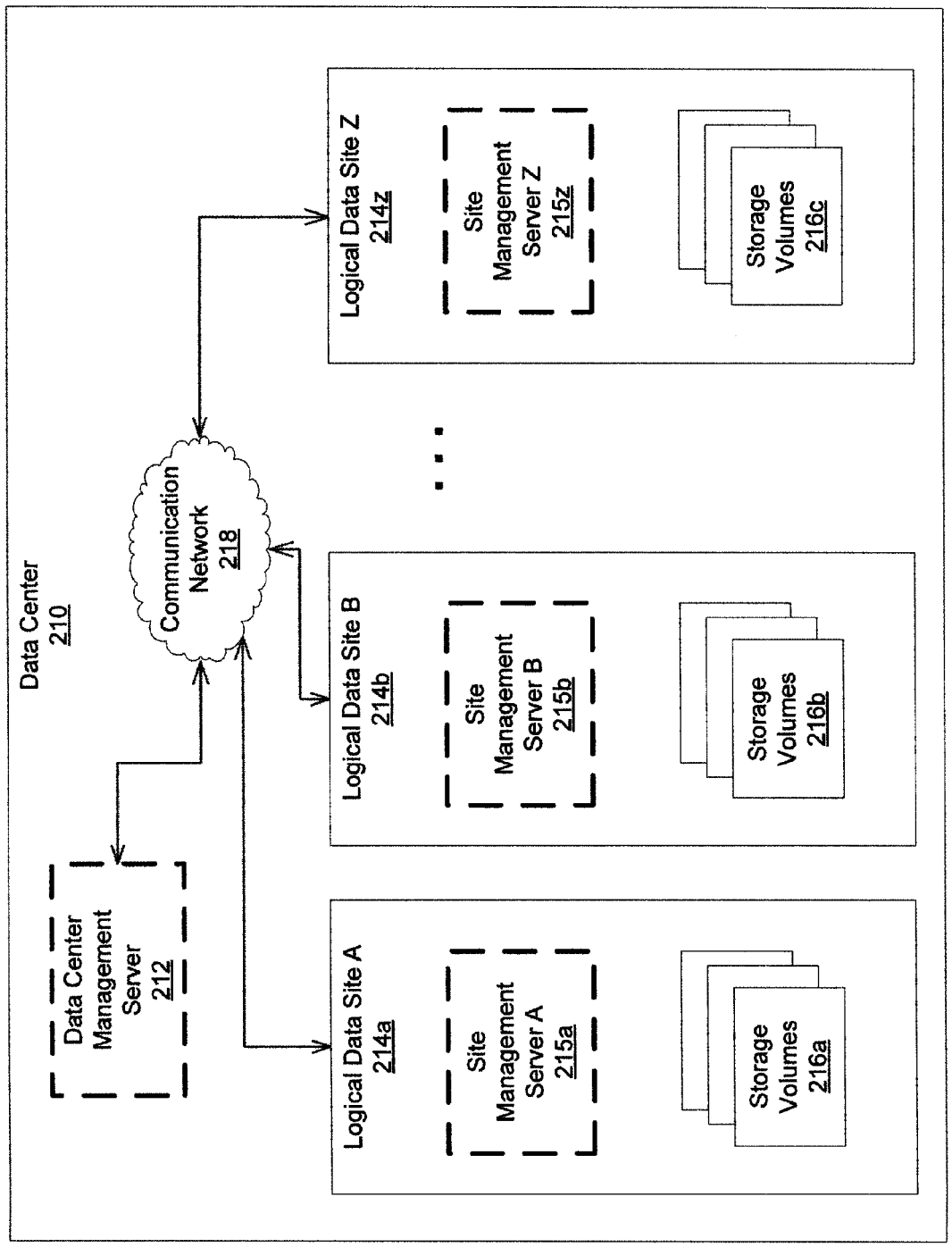
FIG. 2 is a block diagram illustrating an exemplary data center, according to one exemplary embodiment.

FIG. 2 illustrates an exemplary data center 210. The data center 210 includes a data center management server 212, logical data sites A 214*a*, B 214*b* through Z 214*z*, and a communication network 218. Each logical data site A 214*a*, B 214*b* through Z 214*z* includes a site management server A 215*a*, B 215*b* through Z 215*z* and one or more storage volumes 216*a*, 216*b* through 216*z* (e.g., logical storage volumes, storage devices, distributed storage devices, etc.). The data center management server 212 and/or the site manager servers 215*a*, 215*b* through 215*z* can manage the plurality of logical data sites 214*a*-214*z*.

Each logical data site A 214*a*, B 214*b* through Z 214*z* can store and/or retrieve the backup of user data associated with a plurality of users (e.g., subscribers to a backup subscription service, users in a corporate network, etc.). The storage volumes 216*a*-216*z* at each logical site 214*a*-214*z* can store and/or retrieve the backup of the user data.

In some examples, the backup of the user data is stored on a single storage volume (e.g., single storage device, single logical storage volume, redundant array of inexpensive disks (RAID) storage device, etc.). In other examples, the backup of the user data is stored on one or more storage volumes (e.g., distributed backup among a plurality of storage devices, redundant backup among a plurality of logical storage volumes, redundant backup among a plurality of RAID storage devices, etc.).

In some examples, the data center management server 212 manages the backup and/or the restoration for the data center 210 and the site manager server manages the storage and/or retrieval at the respective logical data site.

Although FIG. 2 illustrates a data center 210 with the logical data sites A 214*a*, B 214*b* through Z 214*z*, the data center 210 can include a single logical data site or any number of logical data sites (e.g., twenty, forty, one hundred, etc.). Although FIG. 2 illustrates the data center management server 212 and/or the site management server, the storage and/or retrieval of the backups of user data can be managed individually by either the data center management server 212 or the site management server at each respective logical site.

Figure 3A:
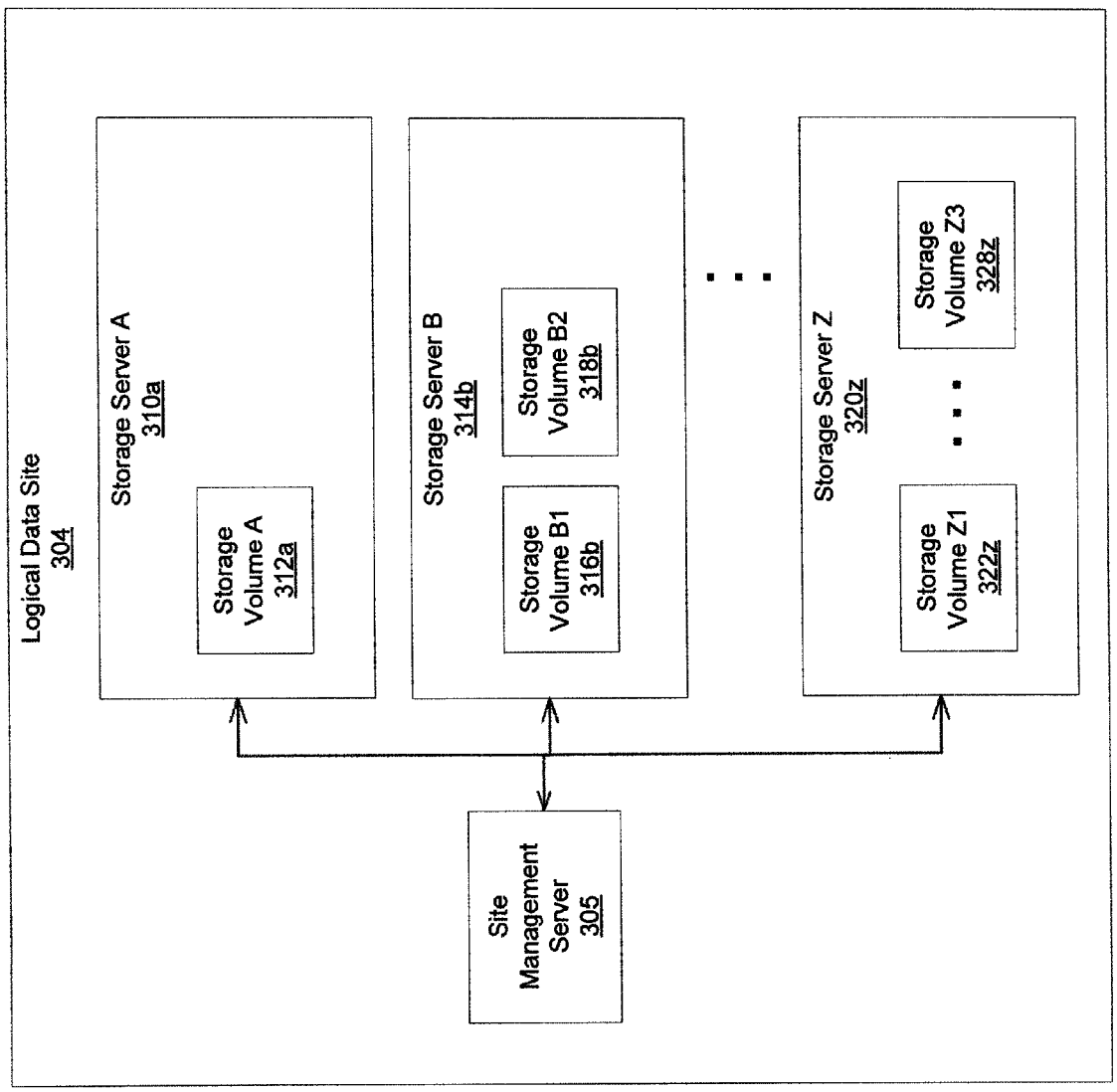
FIGS. 3A-3B are block diagrams illustrating exemplary logical data sites, according to one exemplary embodiment.

FIG. 3A illustrates a logical data site 304. The logical data site 304 includes a site management server 305 and storage server A 310a, 8314b through Z 320z. The storage server A 310a includes a storage volume A 312a. The storage server B 314b includes a storage volume B1 316b and a storage volume B2 318b. The storage server Z 320z includes a storage volumes Z1 322z through Z3 328z. Any number of storage volumes can be grouped within a storage server, Each storage volume includes a plurality of user data backup (not shown). The site management server 305 can communicate with the storage servers A 310a, B 314b through Z 320z to backup and/or restore the backup of the user data.

Although FIG. 3A illustrates storage servers A 310a, B 314b through Z 320z and storage volumes 312a, 316b, 318b, 322z through 328z, the logical data site 304 can include any number of storage servers and/or storage volumes. For example, the logical data site 304 can include four storage servers and each storage server includes forty storage volumes.

In some embodiments, the site management server 305 can include a database server and a server managing storage bandwidth resources for the logical data site 304. In these embodiments, the site management server 305 can control one or more communications servers that act as intermediary between client communication module 805 and the storage servers A 310a, B 314b through Z 320z.

Figure 3B:
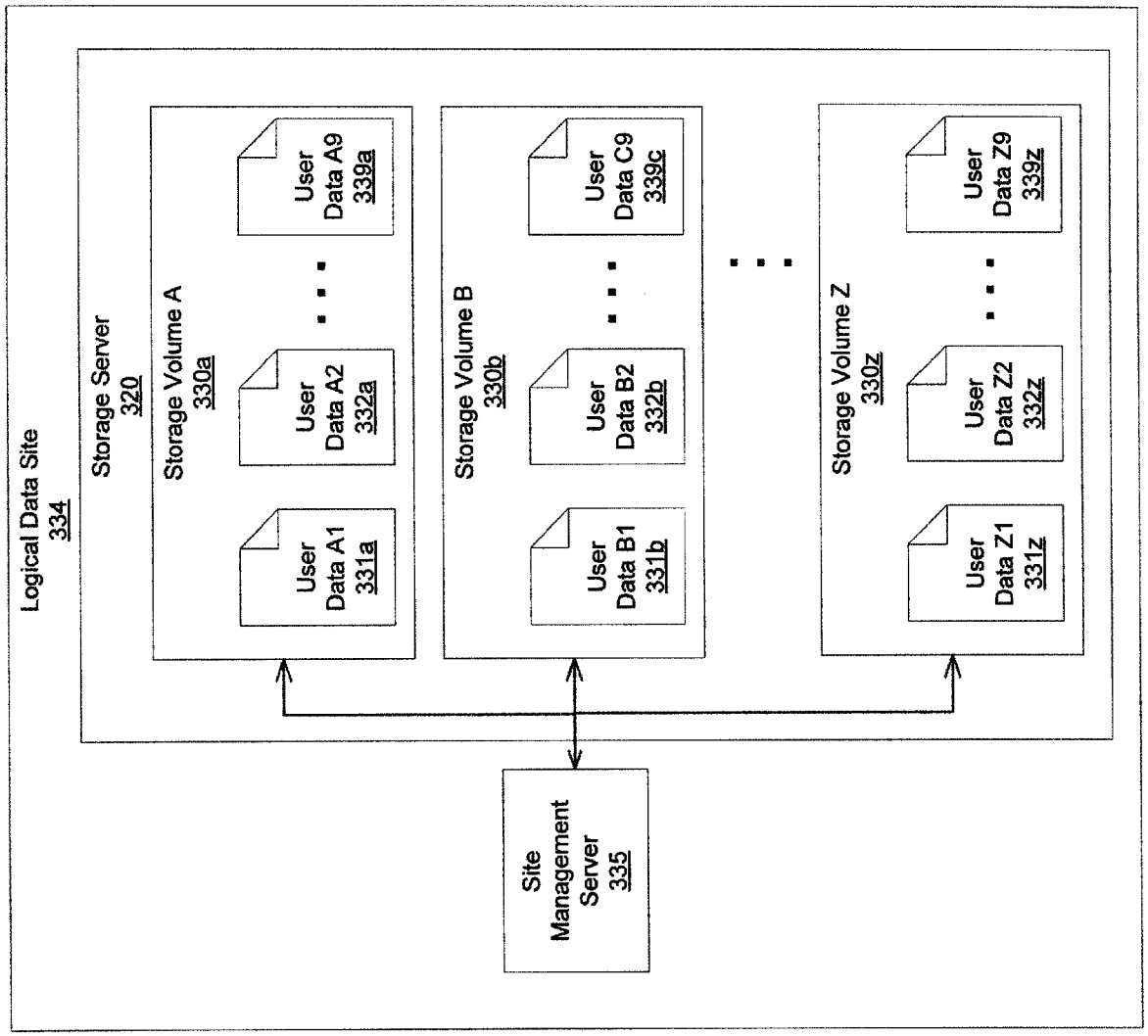

FIG. 3B illustrates a logical data site 334. The logical data site 334 includes a site management server 335 and a storage server 320. The storage server 320 includes storage volumes A 330a, B 330b through Z 330z. Each storage volume A 330a, B 330b through Z 330z includes plurality of user data 1, 2 through 9 (e.g., the user data is the backup of the user data stored on a client device associated with the user). The site management server 335 can communicate with the storage server 320 and/or the storage volumes A 330a, B 330b through Z 330z to backup and/or restore the backup of the user data.

In some examples, the site management server 335 can communicate with the storage volumes to transfer user data between the storage volumes. In some examples, the site management server 335 can communicate with one or more site management servers (not shown) at one or more other logical data sites (not shown to transfer user data between the logical data sites.

Although FIG. 3B illustrates storage volumes A 330a, B 330b through Z 330z and user data 1, 2 through 9, the logical data site 334 can include any number of storage volumes and/or user data. For example, the logical data site 334 can include twenty storage volumes and each storage volume includes user data associated with one thousand users.

Figure 4:
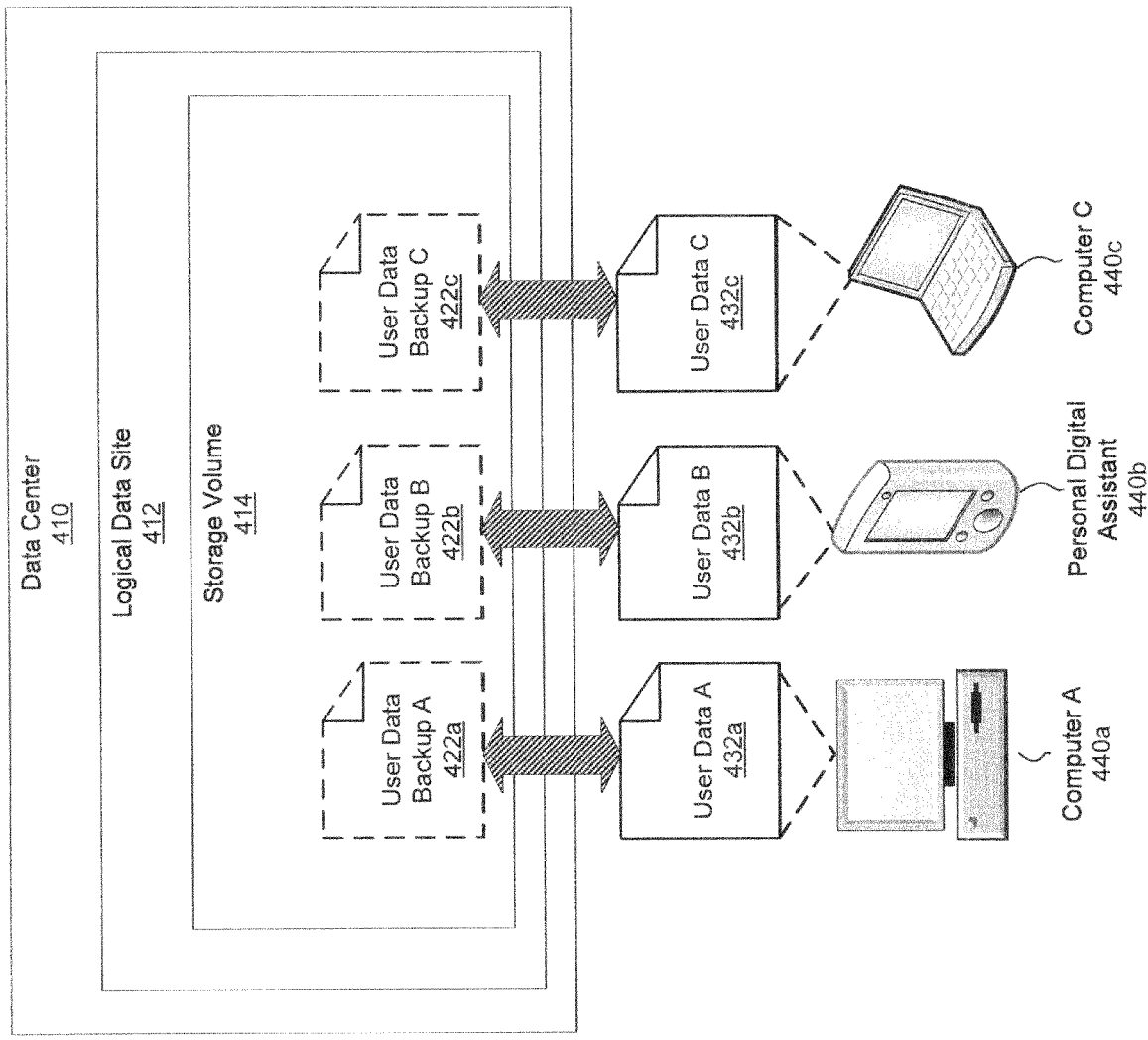
FIG. 4 is a block diagram illustrating an exemplary data center storing user data backup from client devices, according to one exemplary embodiment.

FIG. 4 illustrates an exemplary data center 410 for the backup of user data from one or more client devices 440a, 440b, and 440c. The data center 410 includes a logical data site 412. The logical data site 412 includes a storage volume 414. The storage volume 414 includes user data backups A 422a, B 422b, and C 422c, The user data backups A 422a, B 422b, and C 422c correspond to user data A 432a, B 432b, and C 432c, respectively. The user data A 432a, B 432b, and C 432c are stored on the client devices, computer A 440a, personal digital assistant 440b, and computer B 440c, respectively. As illustrated in FIG. 4, the user data A 432a, B 432b, and C 432c stored on the client devices is backed up to the storage volume 414 on the logical data site 412 in the data center 410.

Figure 5:
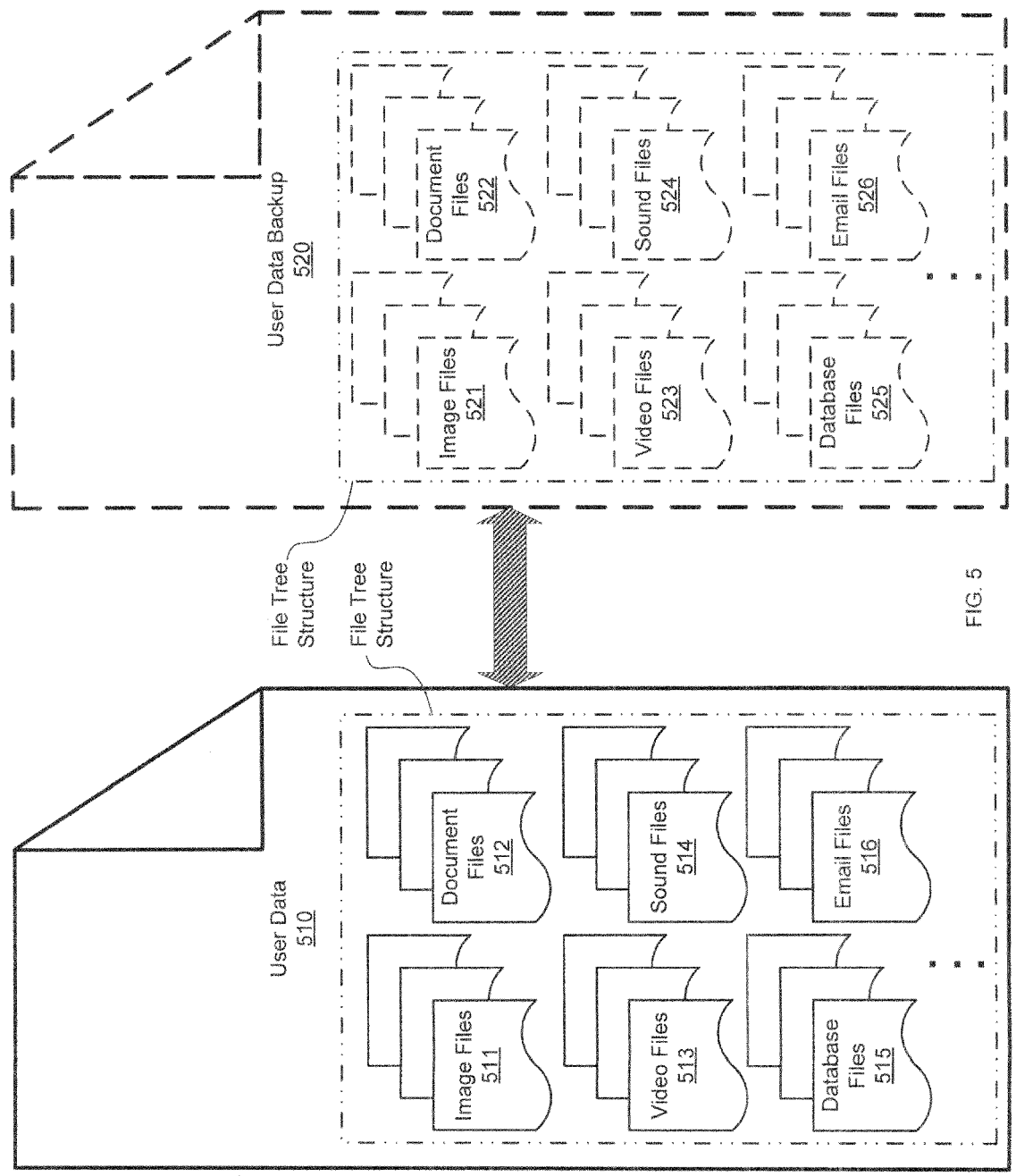
FIG. 5 illustrates exemplary user data and user data backup, according to one exemplary embodiment.

FIG. 5 illustrates exemplary user data 510 and user data backup 520. The user data 510 includes a plurality of files, image files 511, document files 512, video files 513, sound files 514, database files 515, and email files 516, and/or other information (e.g., registry information, user preference information, etc.) stored on a client device in a file tree structure (e.g., hierarchal database, hierarchal flat file, etc.). The user data backup 520 includes a plurality of files, image files 521, document files 522, video files 523, sound files 524, database files 525, and email files 526, and/or other information that is selected for backup by the user, automatically by the management server (e.g., site management server, data center management server, etc.), and/or based on backup templates and/or backup policies. The technology as described herein can be utilized to backup the user data as the user data backup.

Although FIG. 5 illustrates certain types of files (e.g., image files, document files, etc.), the technology as described herein can backup any type of information and/or data stored on the client device and/or a storage device connected to the client device (e.g., external storage device, network connected storage device, etc.).

Figure 6:
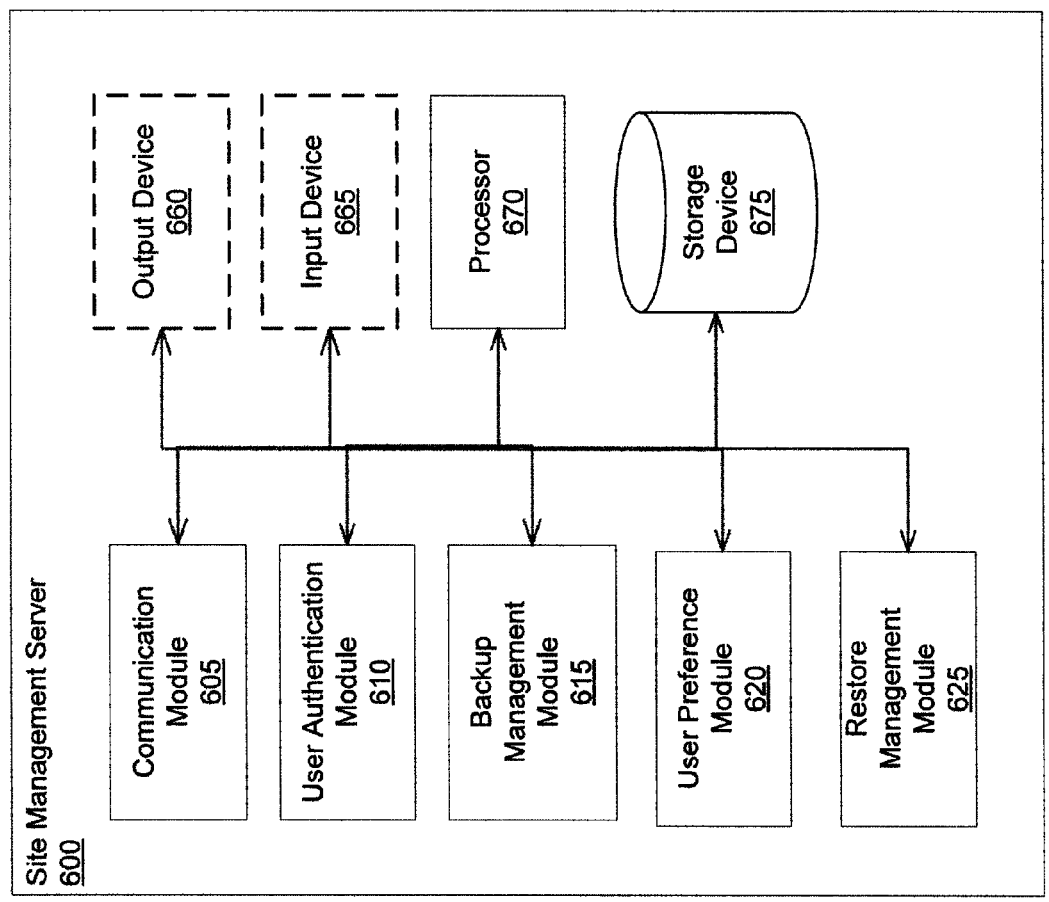
FIG. 6 is a block diagram illustrating an exemplary logical data site management server, according to one exemplary embodiment.

FIG. 6 illustrates an exemplary site management server 600. The site management server 600 includes a communication module 605, a user authentication module 610, a backup management module 615, a user preference module 620, a restore management module 625, an output device 660, an input device 665, a processor 670, and a storage device 675. The modules and/or devices can be hardware and/or software. The modules and/or devices illustrated in the site management server 600 can, for example, utilize the processor 670 to execute computer executable instructions and/or include a processor to execute computer executable instructions (e.g., an encryption processing unit, a field programmable gate array processing unit, etc.). It should be understood that the site management server 600 can include, for example, other modules, devices, and/or processors known in the art and/or varieties of the illustrated modules, devices, and/or processors. It should be understood that the modules and/or devices illustrated in the site management server 600 can be located within the site management server 600 and/or connected to the site management server 600 (e.g., directly, indirectly, etc.), but outside of the physical components of the management server (e.g., personal computer, mobile device, etc.).

The communication module 605 communicates data to/from the site management server 600. The user authentication module 610 authenticates users to the site management server 600. The backup management module 615 manages and/or controls backups to/from the site management server 600. The user preference module 620 manages preferences of users and/or collects information associated with user selections and/or preferences. The restore management module 625 manages restore of user data to a client device.

The output device 660 outputs information and/or data associated with the site management server 600 (e.g., information to a printer (not shown), information to a speaker, etc.). The input device 665 receives information associated with the site management server 600 (e.g., instructions from a user, instructions from a computing device, etc.) from a user (not shown) and/or a computing system (not shown). The input device 665 can include, for example, a keyboard, a scanner, an enrollment device, a scale, etc.

The processor 670 executes the operating system and/or any other computer executable instructions for the management server (e.g., executes applications, etc.). The site management server 600 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 675 stores the files, user preferences, backup sets, access information, an operating system and/or any other data or program code associated with the site management server 600. The storage device can include a plurality of storage devices. The storage device 675 can include, for example, long-term storage (e.g., a hard drive, a tape storage device, flash memory, etc.), short-term storage (e.g., a random access memory, a graphics memory, etc.), and/or any other type of computer readable storage.

Although FIG. 6 illustrates the exemplary site management server 600, any of the management servers described herein (e.g., data center management server, storage server) can include the components and functionality described with respect to the site management server 600.

Figure 7:
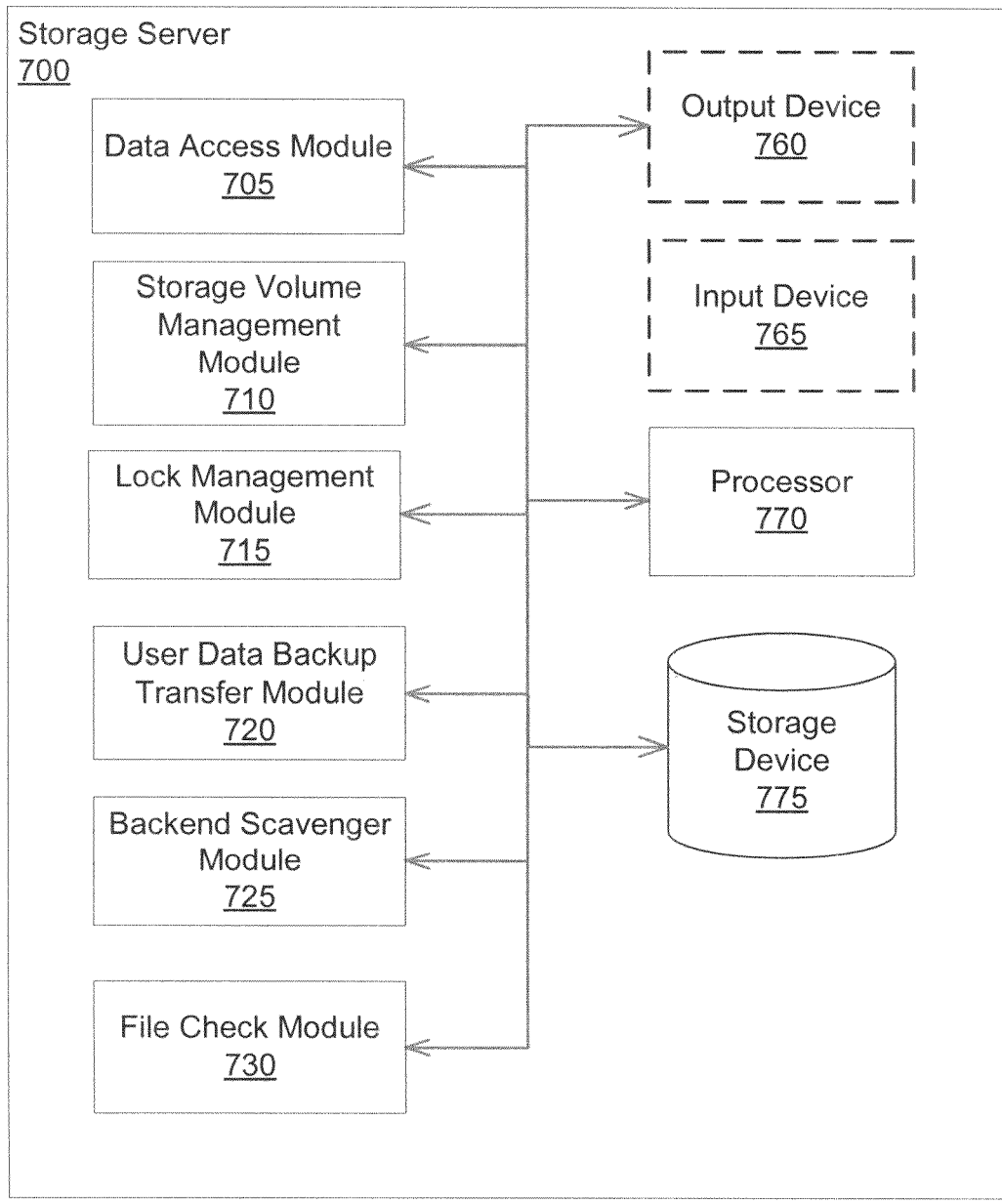
FIG. 7 is a block diagram illustrating an exemplary storage server, according to one exemplary embodiment.

FIG. 7 illustrates an exemplary storage server 700. The storage server 700 includes a data access module 705, a storage volume management module 710, a lock management module 715, a user data backup transfer module 720, a backend scavenger module 725, a file check module 730, an output device 760, an input device 765, a processor 770, and a storage device 775. The modules and/or devices can be hardware and/or software. The modules and/or devices illustrated in the storage server 700 can, for example, utilize the processor 770 to execute computer executable instructions and/or include a processor to execute computer executable instructions (e.g., an encryption processing unit, a field programmable gate array processing unit, etc.). It should be understood that the storage server 700 can include, for example, other modules, devices, and/or processors known in the art and/or varieties of the illustrated modules, devices, and/or processors. It should be understood that the modules and/or devices illustrated in the storage server 700 can be located within the storage server 700 and/or connected to the storage server 700 (e.g., directly, indirectly, etc.), but outside of the physical components of the management server (e.g., personal computer, mobile device, etc.).

The data access module 705 accesses data stored on the storage server 700. The storage volume management module 710 manages user data storages on a storage volume, a logical data site and/or data center.

The lock management module 715 manages locks for locking user data during transfer of user data, maintenance, etc. In some embodiments, the lock management module 715 can manage different types of locks, including a copy lock protecting file copying, an exclusive lock protecting user data from any access to user data, a scavenger lock protecting for read and occasional deletion of expired or corrupt files, a lock protecting user data for reading and writing, a read lock protecting user data for reading, and/or any other type of computer locking mechanism. In some embodiments, the locks can be local to a storage volume, storage server, or logical data site, etc.

The user data backup transfer module 720 manages transfer of user data backup between logical data sites and/or data centers. In some embodiments, the user data backup transfer module 720 transfers user data backup from a source logical data site to a destination logical data site which are located in two different data centers.

The backend scavenger module 725 deletes files no longer required by client for backup. In some embodiments, the client device determines when to purge unwanted files, and updates the backup metadata files accordingly. Using the updated backup metadata files, the backend scavenger module 725 deletes files from storage volumes. The backend scavenger module 725 purges data for expired computers, deletes obsolete backup files, requests resend of missing files, performs server file integrity checks, aggregates client log files, aggregates client log files, gathers server file statistics to logs and database, and/or manages free space in the file system (e.g., NTFS, proprietary file system).

The file check module 730 deletes invalid files (e.g., expired files, suspended files, etc.). The file check module 730 verifies integrity of server files, gathers computer parameters from database, records activity to logs and database, and/or reads storage volume configurations from database, etc. In some embodiments, the file check module 730 moves invalid files to a predetermined folder on each storage volume, and the backend scavenger module 725 performs the actual deletion of the invalid files. In other embodiments, using a proprietary file system, the file check module 730 marks the invalid files for purging, and the file system internally manages the deletion of files marked for purging.

The output device 760 outputs information and/or data associated with the storage server 700 (e.g., information to a printer (not shown), information to a speaker, etc.). The input device 765 receives information associated with the storage server 700 (e.g., instructions from a user, instructions from a computing device, etc.) from a user (not shown) and/or a computing system (not shown). The input device 765 can include, for example, a keyboard, a scanner, an enrollment device, a scale, etc.

The processor 770 executes the operating system and/or any other computer executable instructions for the management server (e.g., executes applications, etc.). The storage server 700 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 775 stores the files, user preferences, backup sets, access information, an operating system and/or any other data or program code associated with the storage server 700. The storage device can include a plurality of storage devices. The storage device 775 can include, for example, long-term storage (e.g., a hard drive, a tape storage device, flash memory, etc.), short-term storage (e.g., a random access memory, a graphics memory, etc.), and/or any other type of computer readable storage.

Although FIG. 7 illustrates the exemplary storage server 700, any of the management servers described herein (e.g., site management server) can include the components and functionality described with respect to the storage server 700.

Figure 8:
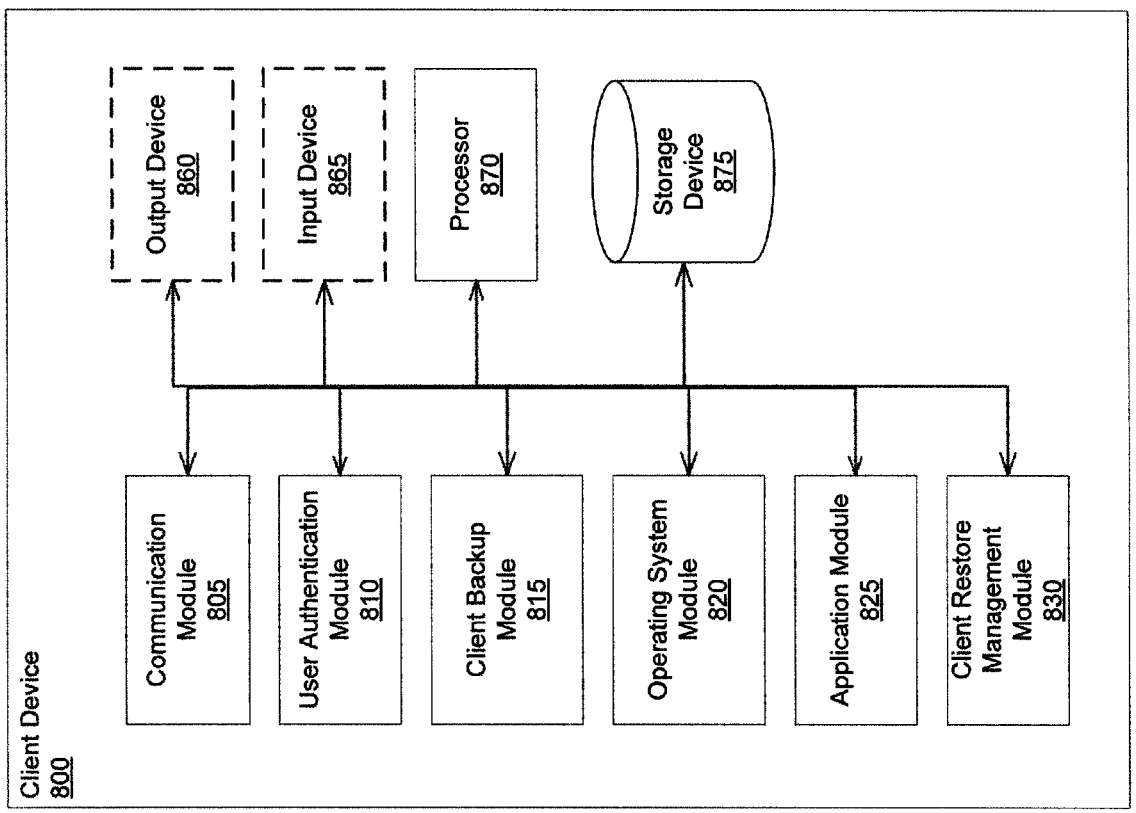
FIG. 8 is a block diagram illustrating an exemplary client device, according to one exemplary embodiment.

FIG. 8 illustrates an exemplary client device 800. The client device 800 includes a communication module 805, a user authentication module 810, a client backup module 815, an operating system module 820, an application module 825, a client restore management module 830, an output device 860, an input device 865, a processor 870, and a storage device 875. The modules and/or devices can be hardware and/or software. The modules and/or devices illustrated in the client device can, for example, utilize the processor to execute computer executable instructions and/or include a processor to execute computer executable instructions (e.g., an encryption processing unit, a field programmable gate array processing unit, etc.). It should be understood that the client device 800 can include, for example, other modules, devices, and/or processors known in the art and/or varieties of the illustrated modules, devices, and/or processors. It should be understood that the modules and/or devices illustrated in the client device 800 can be located within the client device 800 and/or connected to the client device 800 (e.g., directly, indirectly, etc.), but outside of the physical components of the client device 800 (e.g., personal computer, mobile device, etc).

The communication module 805 communicates data and/or information to/from the client device 800. The user authentication module 810 authenticates users for the client device 800 and/or the client backup module. The client backup module 815 backs-up and/or identifies user data for backup. The operating system module 820 operates an operating system on the client device 800. The application module 825 operates one or more applications on the client device 800. The client restore management module 830 manages restore of user data on a client device.

The output device 860 outputs information and/or data associated with the client device 800 (e.g., information to a printer (not shown), information to a speaker, etc.). The input device 865 receives information associated with the client device (e.g., instructions from a user, instructions from a computing device, etc.) from a user (not shown) and/or a computing system (not shown). The input device 865 can include, for example, a keyboard, a scanner, an enrollment device, a scale, etc.

The processor 870 executes the operating system and/or any other computer executable instructions for the client device (e.g., executes applications, etc.). The client device 800 can include random access memory (not shown). The random access memory can temporarily store the operating system, the instructions, and/or any other data associated with the client device. The random access memory can include one or more levels of memory storage (e.g., processor register, storage disk cache, main memory, etc.).

The storage device 875 stores the files, user preferences, backup sets, access information, an operating system and/or any other data or program code associated with the management server (e.g., site management server, data center management server, etc.). The storage device 875 can include a plurality of storage devices. The storage device 875 can include, for example, long-term storage (e.g., a hard drive, a tape storage device, flash memory, etc.), short-term storage (e.g., a random access memory, a graphics memory, etc.), and/or any other type of computer readable storage.

Figure 9:
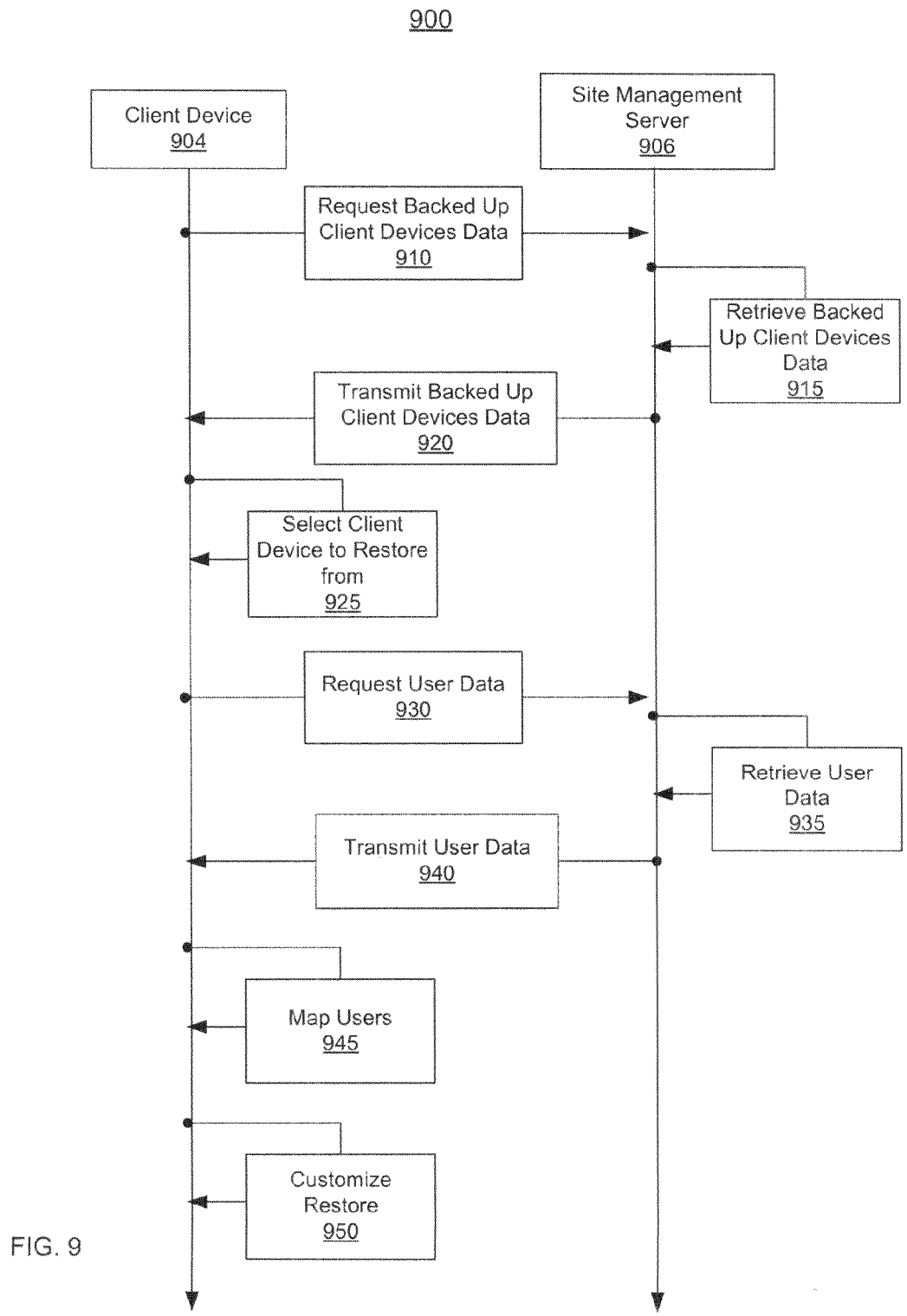
FIG. 9 is a sequence diagram illustrating restoring user data to a client device, according to one exemplary embodiment.

In FIG. 9, a sequence diagram 900 relating to restoring user data to a client device 904 is shown, according to an exemplary embodiment. The user may be backing up data from multiple client devices. The client device 904 may be one of the client devices being backed up. In this embodiment, the user may want to restore some or all files that were backed up from the client device 904. For example, the client device 904 may have suffered disk failure, and the user wants to restore some or all the files back to the client device 904. In another embodiment, the client device 904 is a new device, and the user wants to restore some or all user data from one of the client devices being backed up. In some embodiments, the user installs (not shown) the last version of the backup and restore software to the client device 904.

The client restore management module 830 requests (step 910) data regarding client devices associated with the user's account. In response to the request, the restore management module 625 retrieves (step 915) data regarding client devices associated with the user account from storage. In some embodiments, information regarding client devices (e.g., client device names, type of operating system installed, last backup date, client device description, etc.) associated with the user account is stored in the storage device 675 stored in the site management server 600. In other embodiments, information regarding client devices being backed up is stored in status files stored in the storage device 875 in each individual client device. In these embodiments, the client backup module 815 backs up the status files along with the user data stored on the client device. In these embodiments, the restore management module 830 retrieves information regarding the client devices being backed up from the storage device 775 stored in the storage server 700. The status files may also contain user account data and information regarding files and folders being backed up (e.g., file paths).

The restore management module 625 transmits (step 920) the retrieved information regarding the client devices back to the client restore management module 830. In some embodiments, a list of client devices being backed up is displayed to the user (e.g., utilizing a user interface 1200b or similar interface). For example, as illustrated in the user interface 1200b, the user may have user data backed up from four client devices. At step 925, the user selects a client device whose backed up user data the user wants to restore to the client device 904. In some embodiments, the user is allowed to select more than one client device to restore data from. The client restore management module 830 requests (step 930) data regarding users (e.g., domain users, local users, etc.) associated with the client device selected in step 925. For example, the selected client device may have a Windows operating system and have four Windows user accounts. The restore management module 625 retrieves (step 935) the user data associated with the selected client device and transmits (940) the user data to the client device 904. In other embodiments, the data received in step 920 includes user data and data about files being backed up (e.g., file paths, backup status, etc.).

In some embodiments, the user information associated with the backed up client device is stored in one or more backup metadata files in the storage device 875, and is backed up by the client backup module 815 along with the user data. In some embodiments, the client backup module 815 maintains and periodically (e.g., during every backup job) updates the contents of the backup metadata files. The backup metadata files can contain a list of users that have accounts on the client device. In some embodiments, the backup metadata files only contain information for users that have logged into the client device. In these embodiments, the client backup module 815 determines whether a user has logged into the client device based on existence of profile information for the user.

The received user data can be displayed to the user. For example, a user interface 1200c shown in FIG. 12C illustrates displaying a list of users associated with the selected client device (i.e. source client device) to the user. The user can select any of the displayed users in the list in order to restore data associated with the selected users. For example, the user may only want to restore user data associated with the "mjames" user.

The client restore management module 830 determines users (e.g., domain users, local users, etc.) associated with the client device 904 based on profile information. For example, if the client device 904 has a Windows XP operating system installed, the client restore management module 830 can determine the users associated with the client device 904 by examining the contents of the "C:\Documents and Settings" folder. The domain or local users who have logged into the client device 904 will have a corresponding folder in the "C:\Documents and Settings" folder. In another example, if the client device 904 has a Windows Vista or Windows 7 operation system installed, then the client restore management module 830 determines the users associated with the client device 904 by analyzing the contents of the "C:\Users" folder. In other embodiments, the client restore management module 830 determines the users on the client device 904 by looking in the registry of the client device 904. For example, the client restore management module 830 can make an API call to an API library (e.g., Windows API library) to retrieve information regarding users on the client device 904.

Once the users (e.g., Windows domain users) associated with the client device 904 are determined, the client restore management module 830 maps (step 945) the received list of users in step 940 to the users associated with the client device 904 advantageously allowing users to migrate data from multiple accounts to a new client device and/or operating system. In some embodiments, the client restore management module 830 maps users (e.g., domain users, local users) by matching the user names. The client restore management module 830 can map a local user associated with the client device selected in step 925 (i.e., source client device) to a local user associated with the client device 904 having the same user name. In some embodiments, if the client restore management module 830 does not find a local user profile associated with the client device 904, with the same name as the local user associated with the source client device, the client restore management module 830 can create a new local user on the client device 904. The user may be prompted for a password for the new local user on the client device 904. In other embodiments, the client restore management module 830 can match the local user account associated with the source client device to an existing local account on the client device 904 with a non-matching user name.

In some embodiments, the client restore management module 830 can map a domain user associated with the source client device to a domain user associated with the client device 904 having the same domain user name. If a matching domain user is found on the client device 904 but a local profile for this domain user does not exist, the client restore management module 830 may create the local profile on client device 904 and may prompt the user for a password. In some embodiments, if the client restore management module 830 does not find a matching domain user on the client device 904, the client restore management module 830 can search for a local user associated with the client device 904 having the same name as the domain user associated with the source client device. In these embodiments, if the client restore management module 830 does not find a domain user or a local user on the client device 904 with a user name matching a domain user on the source client device, the client restore management module 830 can create a new local user on the client device 904 or map to another existing domain account (e.g., prompting for domain user password if no local profile exists). In other embodiments, if no matching account is found on the client device 904, the client restore management module 830 can map the user account on the source client device to a folder outside of accounts on the client device 904.

In some embodiments, the client restore management module 830 maps users using a phonetic algorithm (e.g., Soundex algorithm, Metaphone algorithm, etc.). In some embodiments, not all the users in the received list of users have a corresponding user account on the client device 904. In these embodiments, the client restore management module 830 can create new user accounts on the client device 904. As illustrated in FIG. 12D, the user can be prompted for a password for the new user account.

Figure 12A:
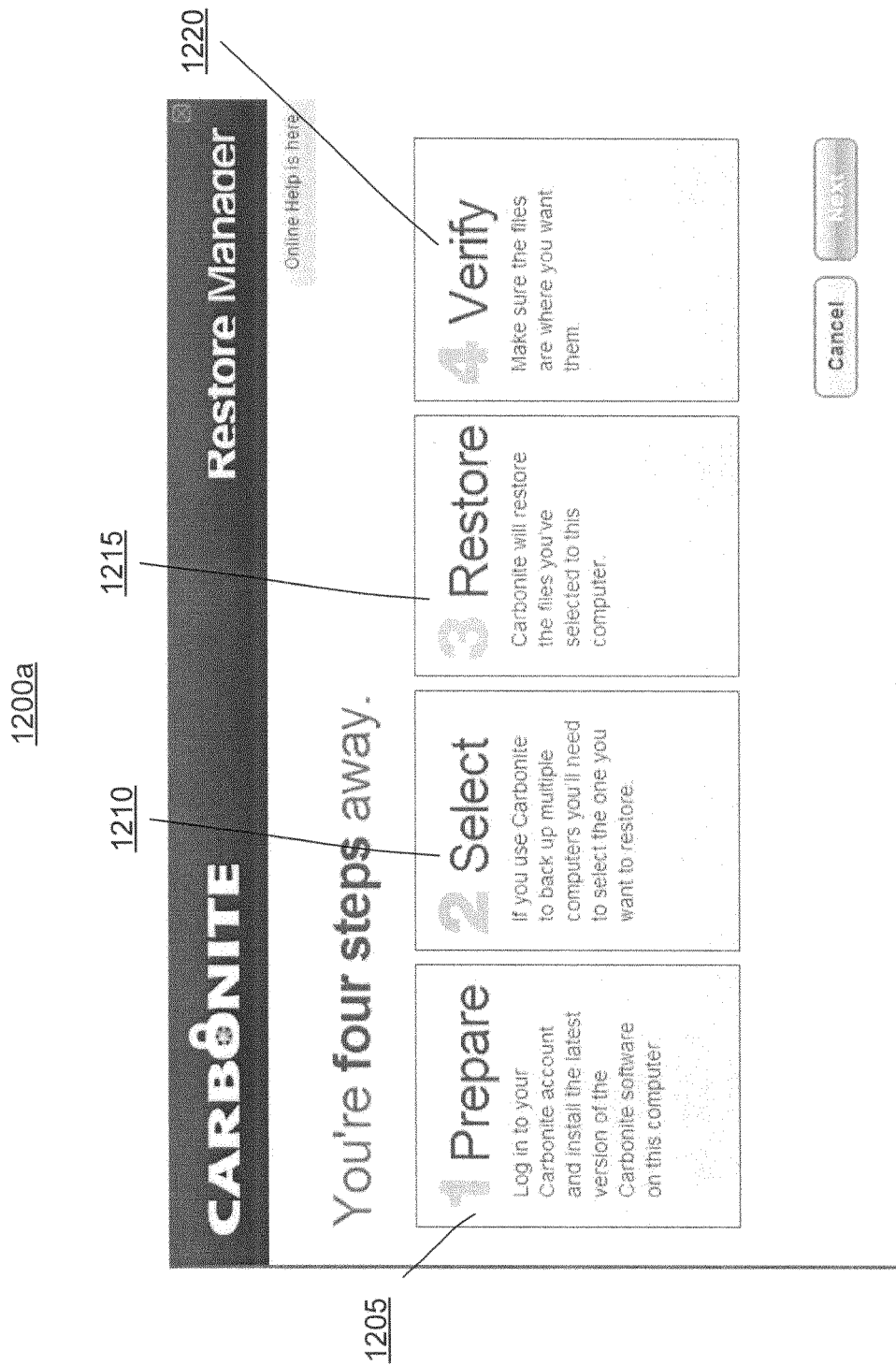
FIGS. 12A-I illustrate exemplary interfaces related to selecting user data to restore to a client device.
Figure 12B:
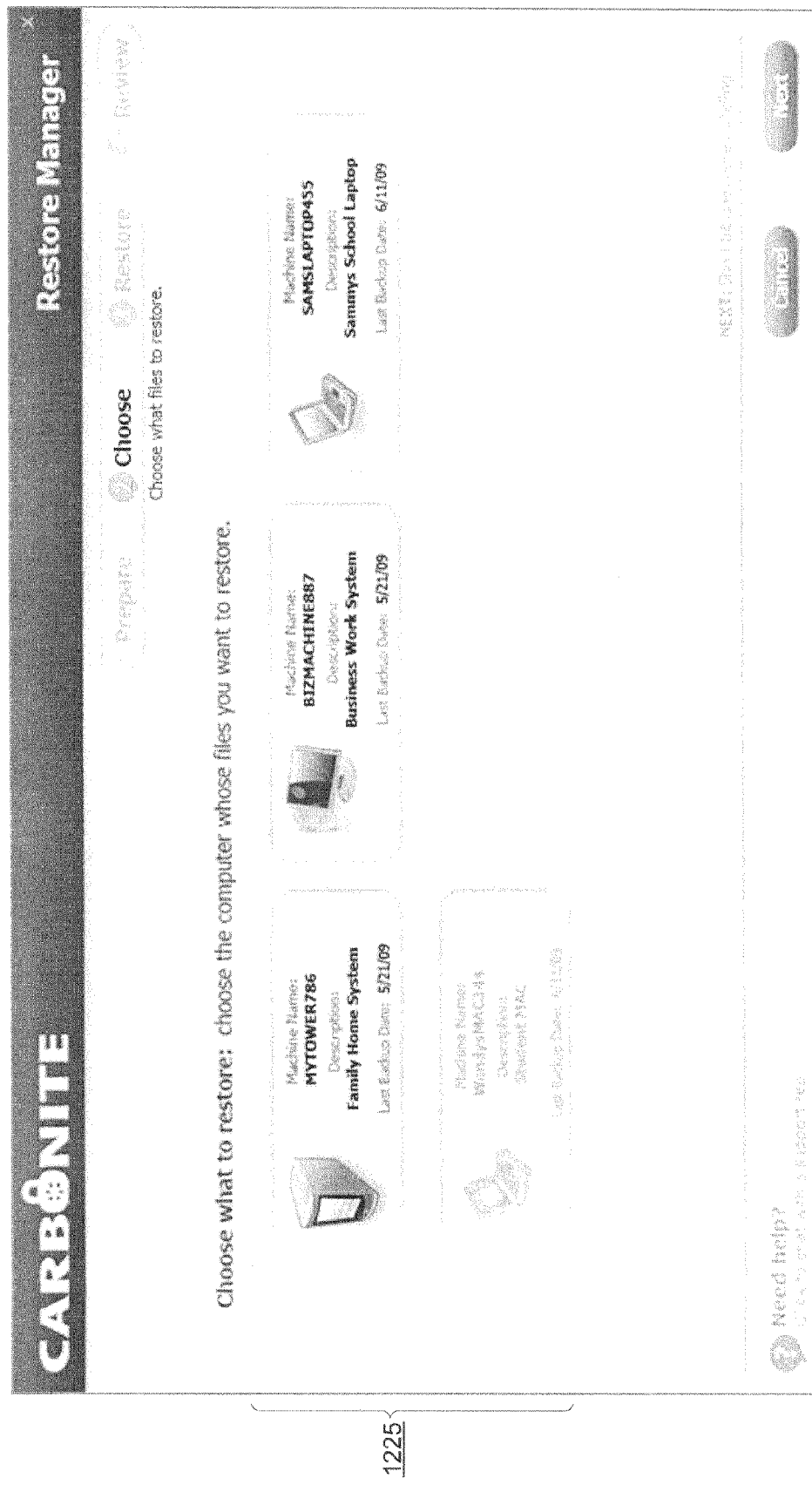
Figure 12C:
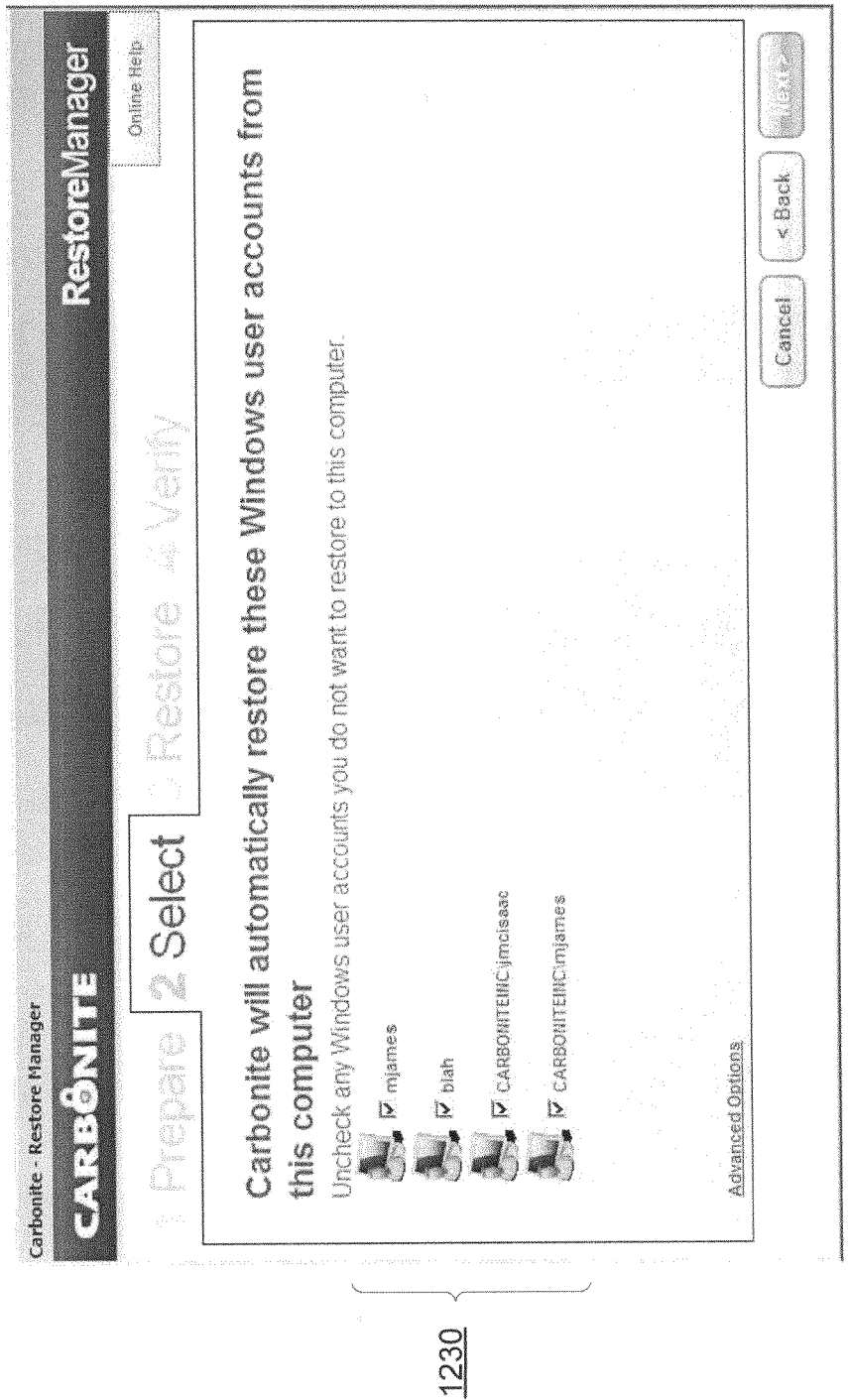
Figure 12D:
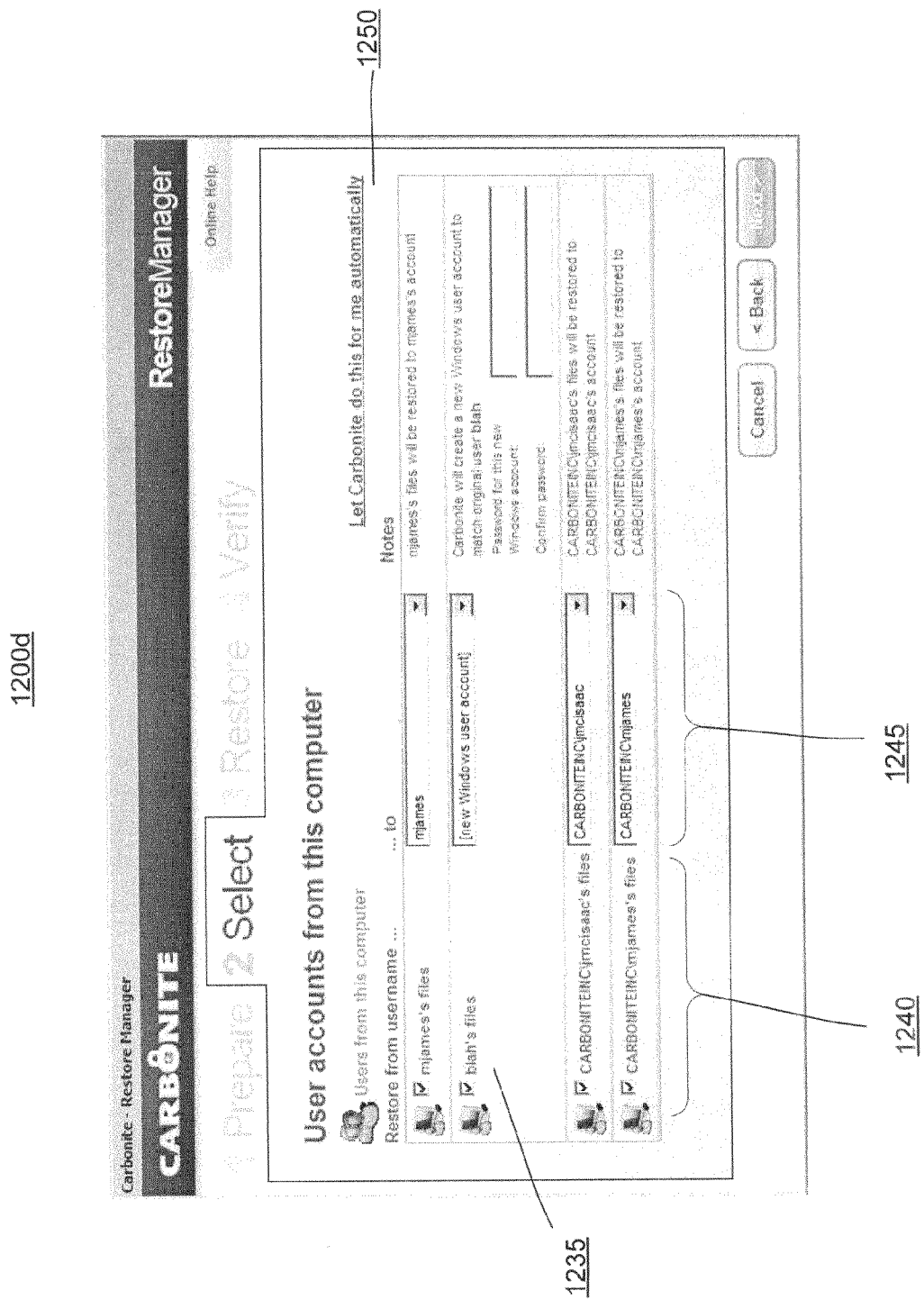
Figure 12E:
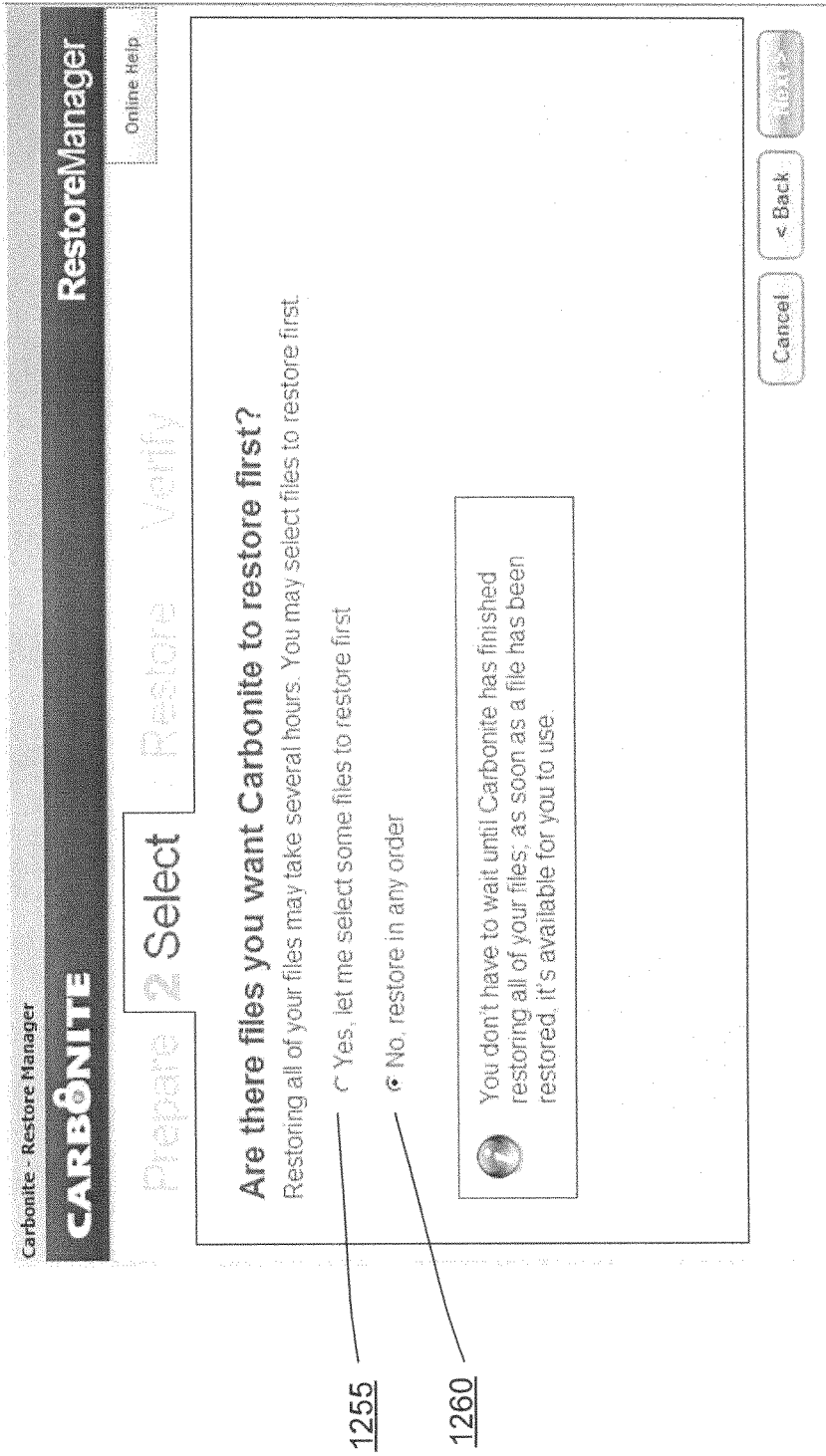
Figure 12F:
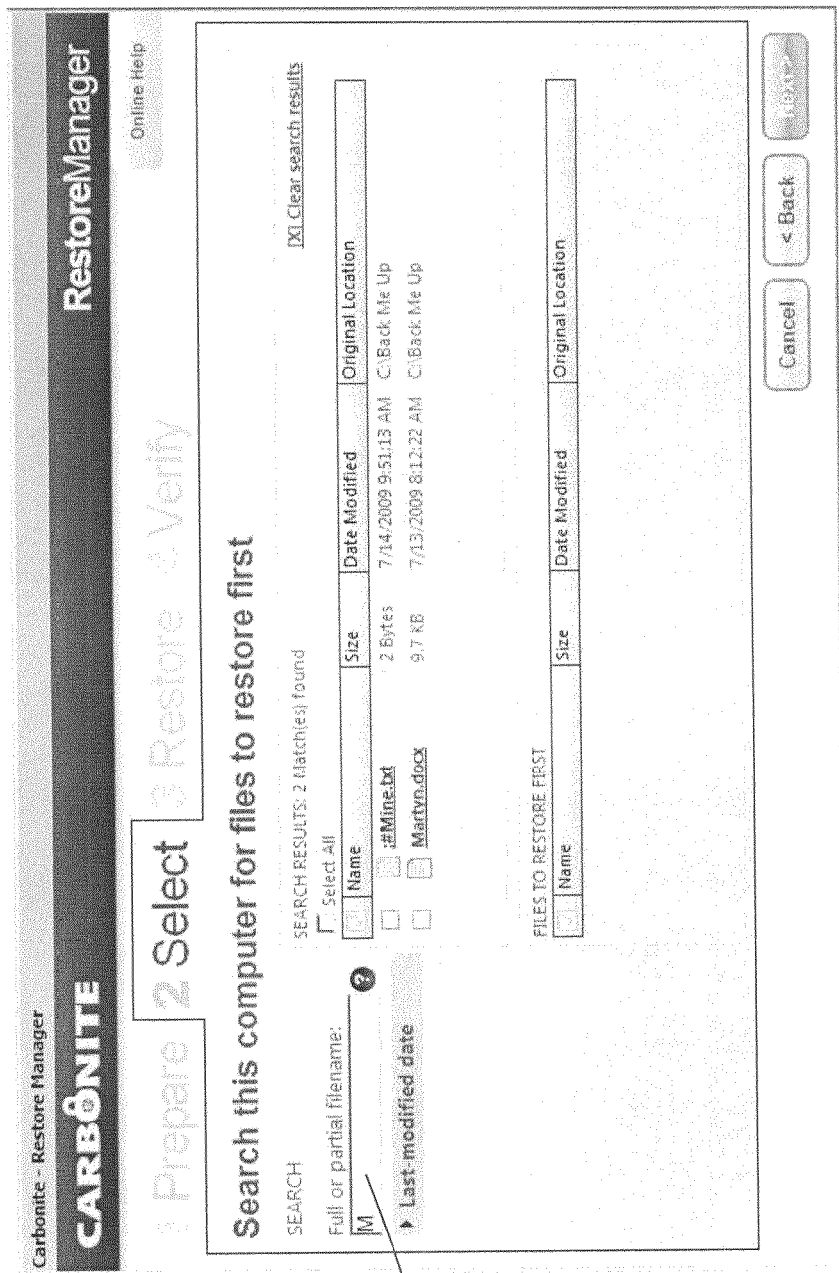
Figure 12G:
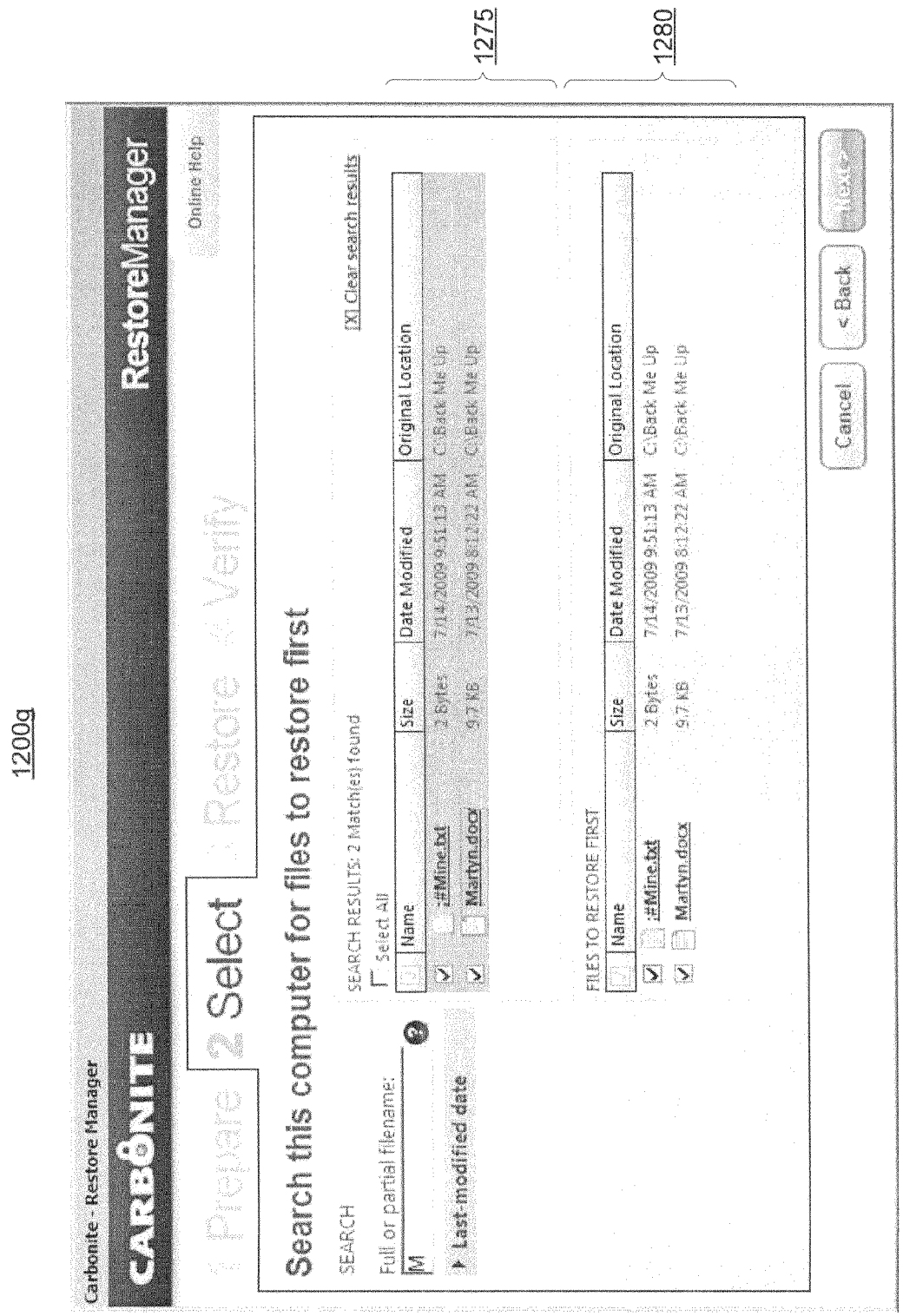

The user can customize (step 950) the restore process as illustrated in FIGS. 12C-I. For example, the user may change the mappings of users as determined by the client restore management module 830 in step 945, as illustrated in FIG. 12D. In some embodiments, the user may want to restore some or all files from the selected client device, but may need certain files or folders immediately. As shown in FIGS. 12E-G, the user can select individual files or folders to be restored first. In some embodiments, the user can select one or more file types such that all files with the selected file types are restored first (not shown). For example, the user may want to restore all the Microsoft Word documents first. In other embodiments, the user can prioritize the order in which some or all the files are restored to the client device 904 (e.g., restore ".doc" documents first, restore ".pdf" documents second, etc.)

Figure 10:
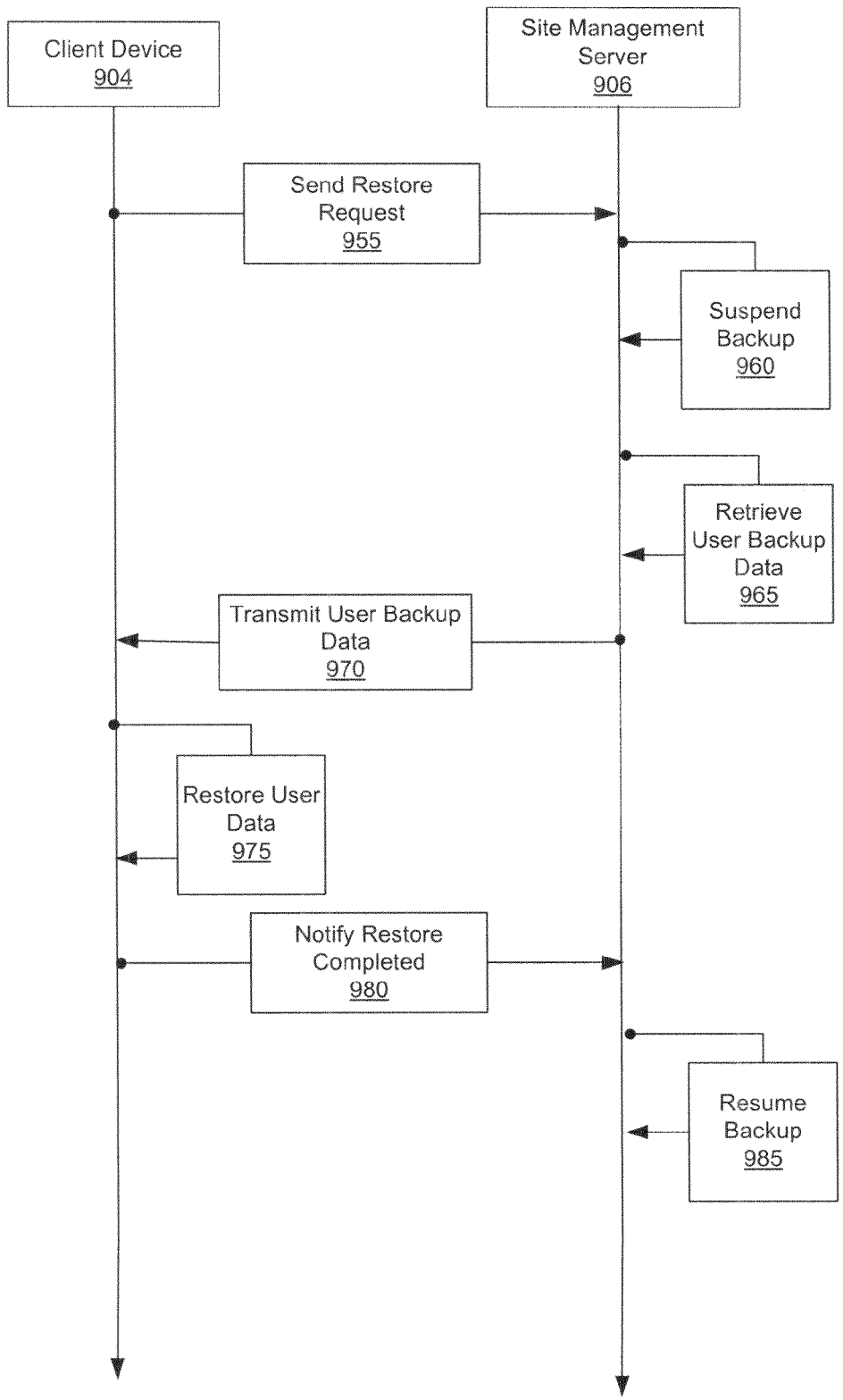
FIG. 10 is a sequence diagram illustrating restoring user data to a client device, according to one exemplary embodiment.
Figure 11:
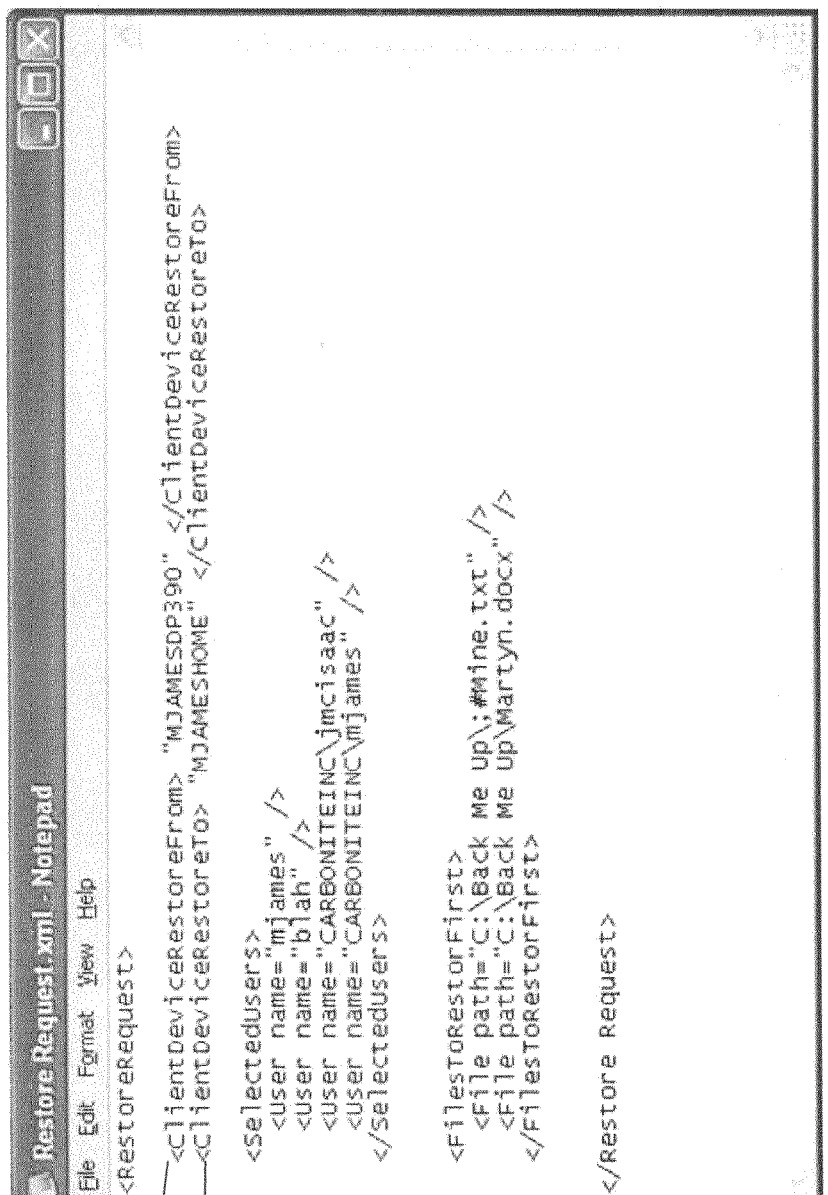
FIG. 11 illustrates an exemplary restore request.

In FIG. 10, a sequence diagram 1000 relating to restoring user data to a client device 904 is shown, according to an exemplary embodiment. Based on the selections made by the user in steps 925 and 950, the client restore management module 830 sends (step 955) a restore request to the site management server 906 requesting user data as specified in the restore request. FIG. 11 illustrates an exemplary restore request 1100 generated by the client restore management module 830. The restore request 1100 includes client device information (e.g., client device name, identification number, etc.) 1105 regarding the client device being backed up. The restore request 1100 includes client device information 1110 regarding the client device 904. The restore request 1100 can include user information 1115 regarding selected users associated with the client device whose user data will be restored. The restore request 1100 includes a list of files 1120 (e.g., file paths) that have to be restored to the client device 904 first. In other embodiments, the restore request 1100 can include an order in which individual files or folders are to be restored. In other embodiments, the client restore management module 830 sends a separate restore request to the site management server 906 for each file. In these embodiments, the client restore management module 830 controls the priority of the restore requests and mapping data associated with the user accounts to correct locations on the client device 904. The client restore management module 830 can build a list of restore jobs to be processed, such that each file is restored from the site management server 906 in a separate restore request.

The restore management module 625 receives the restore request from the client device 904 and suspends (step 960) backup processes associated with the backed up client device. In some embodiments, the client restore management module 830 suspends backup and informs the site management server 906 of the backup suspension. Suspending backup can include suspending backup of user data, as well as of backup of metadata files. In some embodiments, the suspension of backup can be triggered by the user. In other embodiments, the backup processes associated with the backed up client device are not suspended during the retrieval of backed up user data and transmission of the backed up user data to the client device 904. In these embodiments, the restore management module 625 suspends the backup process after the user data is restored to the client device 904. The restore management module 625 resumes backup processes after confirming that all the backed up user data was restored to the client device 904. In other embodiments, backup is resumed by the client restore management module 830 (e.g., with user consent).

The restore management module 625 retrieves (step 965) backed up user data from the storage device 775. In some embodiments, the restore management module 830 requests the backed up user data from the data access module 705. In some embodiments, the restore management module 625 encrypts the retrieved backed up user data before sending it to the client device 904. The restore management module 625 is not restricted to any encryption algorithm, and may use any symmetric, asymmetric, or hybrid asymmetric encryption algorithms, including but not limited to RSA scheme (e.g., PKCS#7, DES/DES3, Blowfish, IDEA, SEAL, Mars, RC4, SEED, etc). The restore management module 625 can request the encryption method and key from the user preference module 620.

The restore management module 625 transmits (step 970) the backed up user data to the client device 904 (e.g., using FTP or any other protocol). In some embodiments, the restore management module 625 transfers one file at a time to the client device 904. In other embodiments, the restore management module 625 transfers several files at a time. In other embodiments, the restore management module 625 compresses all files and transmits the compressed files to the client device 904. The restore management module 625 and/or the client restore management module 830 may monitor network bandwidth to ensure that the network bandwidth is not overloaded during the transmitting of the backed up user data. The client restore management module 830 can monitor the client device 904 CPU and disk usage. The client restore management module 830 can adjust the restore rate to ensure that the client device CPU and/or disk usage is not overloaded or used too heavily. The client restore management module 830 can track the current file position being downloaded. If the connection is interrupted, the client restore management module 830 can request that the restore management module 625 resume transmitting from that point when the connection is resumed. In some embodiments, the client restore management module 830 can skip download a file already stored on the client device 904 (e.g., pre-existing or duplicate files).

The client restore management module 830 receives backed up user data from the site management server 906. In some embodiments, the client restore management module 830 decompresses and decrypts received data. The client restore management module 830 restores (step 975) received user data to the storage device 875 on the client device 904. In some embodiments, the client restore management module 830 determines the location on the storage device 875 for each received file or folder. The backed up client device and the client device 904 may have different operating system environments installed, and the client restore management module 830 determines the correct location for user files on the client device 904. For example, if the backed up client device has a Windows XP operating system installed, and the client device 904 has a Windows Vista operating system installed, the client restore management module 830 will restore a file from a "C:\Documents and Settings\mjames\Backup\2009" folder on the backed up client device to a "C:\Users\mjames\Backup\2009" folder on the client device 904. In another example, the backed up client device is a MAC computer, and the client device 904 is a PC. In this example, the client restore management module 830 determines the corresponding file locations on the client device 904 advantageously eliminating the need for the user to know about different operating system directory substructures when restoring to a computer with a new operating system. In other embodiments, the location mapping (i.e., including mapping files, attributes and associated metadata associated with the files such as read/write flags, owner and user-groups information, access-control lists, encryption policy data, etc.) is performed in step 945. In some embodiments, the sub folder structure is preserved unless the path is considered to be too long.

The correct locations for files beneath the user-profile folders (e.g., "mjames" folder) vary between various operating system (e.g., documents are kept in "My Documents" in Windows XP, while documents are kept in "Documents" in Windows Vista and Windows 7). In some embodiments, these locations may be specified in the registry (e.g., Windows registry) for each user profile. In these embodiments, the client restore management module 830 reads the specific locations from the registry, and compares them to the file location stored in the backup metadata files associated with the source client device. Accordingly, the client restore management module 830 advantageously restores data to equivalent locations on the client device 904.

In some embodiments, when the client restore management module 830 fails to restore a file to a location (e.g., protected folder), the client restore management module 830 restores the file to another location. For example, the client restore management module 830 can restore all files that could not be restored to the same folder (e.g., "C:\Restore Folder"). The restore report illustrated in an interface 1300 may indicate the location of the files that originally failed to restore. The client restore management module 830 may maintain a list of folders that contain files that should not be overwritten (e.g., application settings may become corrupted with old metadata). The client restore management module 830 restores these folders to a different location.

Once the client restore management module 830 finishes restoring the backed up user data to correct locations on the client device 904, the client restore management module 830 notifies (step 980) the restore management module 625 that the restore process is completed. At this point, the restore management module 625 resumes (step 985) the backup processes associated with the backed up client device. In some embodiments, the client device 904 makes the determination of suspension and resumption of backup (e.g., can be initiated by the user). In these embodiments, suspended backup services are resumed with acknowledgement from the user. In other embodiments, backup services are not suspended during the restore operations.

FIG. 12A illustrates an exemplary user interface 1200a providing an overview to the user of the steps that will occur during the restore process. In some embodiments, the user can view the user interface 1200a in a web browser. In other embodiments, the user can view the user interface 1200a in a local stand alone application performing backup and restore. As indicated in box 1205, the user will log into their account associated with the backup and restore application, and install the latest version of the backup software on the user's current client device. The latest version of the backup software is advantageously installed on the current client device so that the client restore management module 830 can access system configuration information to restore backed up user data to correct locations on the current client device. In other embodiments, the latest version of the backup software is not installed, and the restore is performed through a web browser. Box 1210 indicates that if the user is backing up data from multiple client devices, then the user will need to select a single client device whose data the user would like to restore to the current client device. In some embodiments, the user can restore from multiple client devices at the same time. Once the user selects the client device whose data the user wants to restore, the client restore management module 830 will restore selected files to the current client device. Finally, the user will verify that the files are restored to correct locations.

FIG. 12B illustrates an exemplary user interface 1200b displaying a listing of client devices 1210 associated with a user account in graphical representations providing important client device information (i.e., user selected machine name, last backup date, etc.) that helps the user identify the correct client device to restore backed up user data from. For each listed client device, the user interface 1200b provides a machine name, description, and last backup date. The machine name may be a descriptive name selected by the user, independent of the standard operating system facility of the client device and network names. The user interface 1200b can display other information associated with the client devices being backed up (e.g., operating system information, total backup size, etc.). Using the interface 1200b, the user chooses the computing device whose files the user wants to restore to the current computing device. In some embodiments, the interface 1200b is not displayed to the user if only one client device is being backed up.

FIG. 12C illustrates an exemplary user interface 1200c displaying a listing of user accounts 1230 associated with the computing device the user selected in the interface 1200b. In some embodiments, the user accounts are selected by default, and the user can unselect any user accounts that the user does not want to restore. In other embodiments, the user is not allowed to uncheck any of the displayed user accounts. In other embodiments, a user interface (not shown) is displayed to the user indicating that all source client device user accounts were automatically matched to the current client device user accounts. In these embodiments, the mapping of user accounts is automated without any user intervention eliminating the need for the user to understand the concept of user accounts (e.g., Windows user accounts). The user may be allowed to view amore detailed interface (e.g., user interface 1200c) in order to customize the automated mapping.

FIG. 12D illustrates an exemplary user interface 1200d for mapping user accounts. The user accounts 1240 are associated with the computing device selected by the user in the user interface 1200c (i.e., the backed up device from which the user wants to restore user data from). The user interface 1200d enables the user to unselect any of the user accounts 1240 such that user data associated with the unselected user accounts will not be restored to the current computing device. The user accounts 1245 are associated with the current client device (i.e., the target device to which the user wants to restore user data to). In some embodiments, all the user accounts 1240 match to the user accounts 1245. In other embodiments, some of the user accounts 1240 may not have corresponding user accounts on the current client device. As illustrated in the user interface 1200d, the user account 1235 does not have a corresponding user account "blah" on the current client device. The user interface 1200 indicates that a new Windows user account is going to be created, and prompts the user for password information for the new account. As a result, the client restore management module 830 creates anew account, including a new profile, on the current client device to correspond to the user account 1235, advantageously eliminating the need for an administrator to manually create the required accounts on the current client device (e.g. new operating system is installed on the current client device, the current client device is a new client device). The client restore management module 830 integrates with the account security mechanism of the current client device operating system such that the new account complies with existing operating system security policy (e.g., Windows domain security). In some embodiments, the user interface 1200d can allow the user to change the user name for the new account. In other embodiments, the password for the new user account is not set. In other embodiments, a new account is not created and the user's backed up data is restored to a different temporary location (e.g., desktop folder) on the current client device.

The user interface 1200d enables the user to change the suggested mappings between the user accounts. In some embodiments, the user can choose to restore user data to folders associated with an existing user (e.g., domain user, local user) by clicking on a drop down menu and selecting one of the existing users. In other embodiments, the user can choose to restore user data to folders associated with a new user. In these embodiments, the user is prompted for new user information such as domain user, domain user password, and/or domain name. For example, the user can select to restore user data from user name "mjames" to domain user "domuser" and not to "mjames". As a result, the user data associated with the "mjames" user will be restored to the local profile for the "domuser" domain user. In other embodiments, the user is not allowed to change the mappings between user accounts. The user interface 1200d enables the user to allow for automatic mapping of user account without any user intervention (e.g., hyperlink 1250). In these embodiments, the user may be notified that user accounts in the backup client device match the user accounts on the current client device and that all the user accounts will be restored.

FIG. 12E illustrates a screen shot of an interface 1200e that enables the user to prioritize restore of user data. For example, the user may want to get all the files from the backed up client device but may need certain files immediately. To select specific files to be restored first, the user can select radio button 1255. On the other hand, to allow the restore process to restore files in any order, the user can select radio button 1260. FIGS. 12F and 12G illustrate exemplary interfaces allowing the user to prioritize restoring of files. Interface 1200f allows the user to search for files backed up from the backed up client device meeting search criteria (e.g., full or partial user names). For example, as illustrated in the interface 1200f, the user can search for all files starting with the letter "M" by entering search criteria "M" into a file name search textbox 1265. The search results information panel 1270 includes two files starting with the letter "M" (e.g., ";#Mine.txt" and "Martyn.docx") and displays information regarding each file such as file name, file size, last date the file was modified, and original location of the file on the backed up client device. In other embodiments, the search results information panel 1270 can display other information associated with the found files (e.g., last backup date, percentage of the file size relative to the total backup size, etc.). As illustrated in FIG. 12G, the user can select the files displayed in a search results panel 1275 by clicking on a file or dragging it to a first files to restore panel 1280. As a result of the user's selections, the selected files are displayed in the first files to restore panel 1280.

Figure 12H:
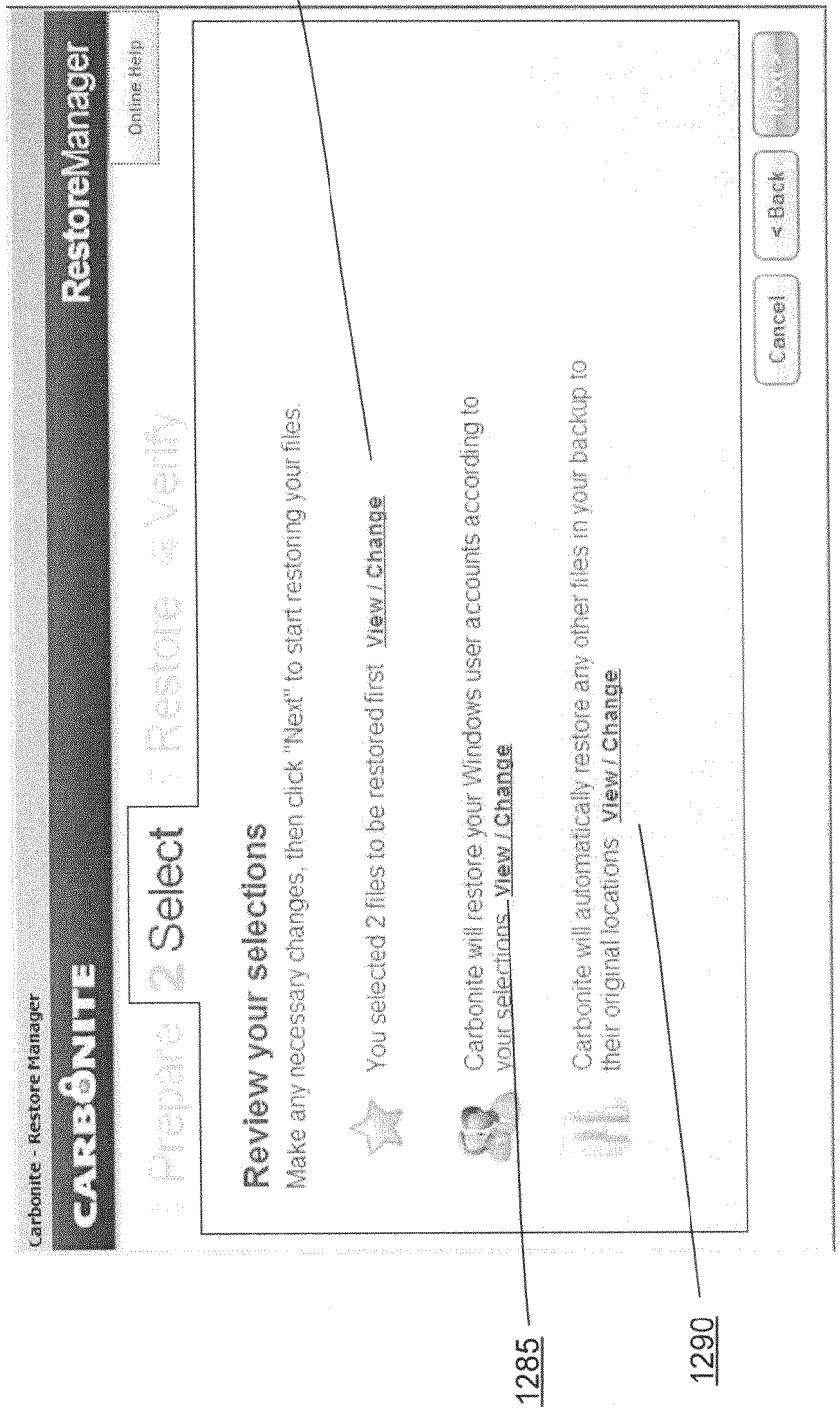
Figure 12I:
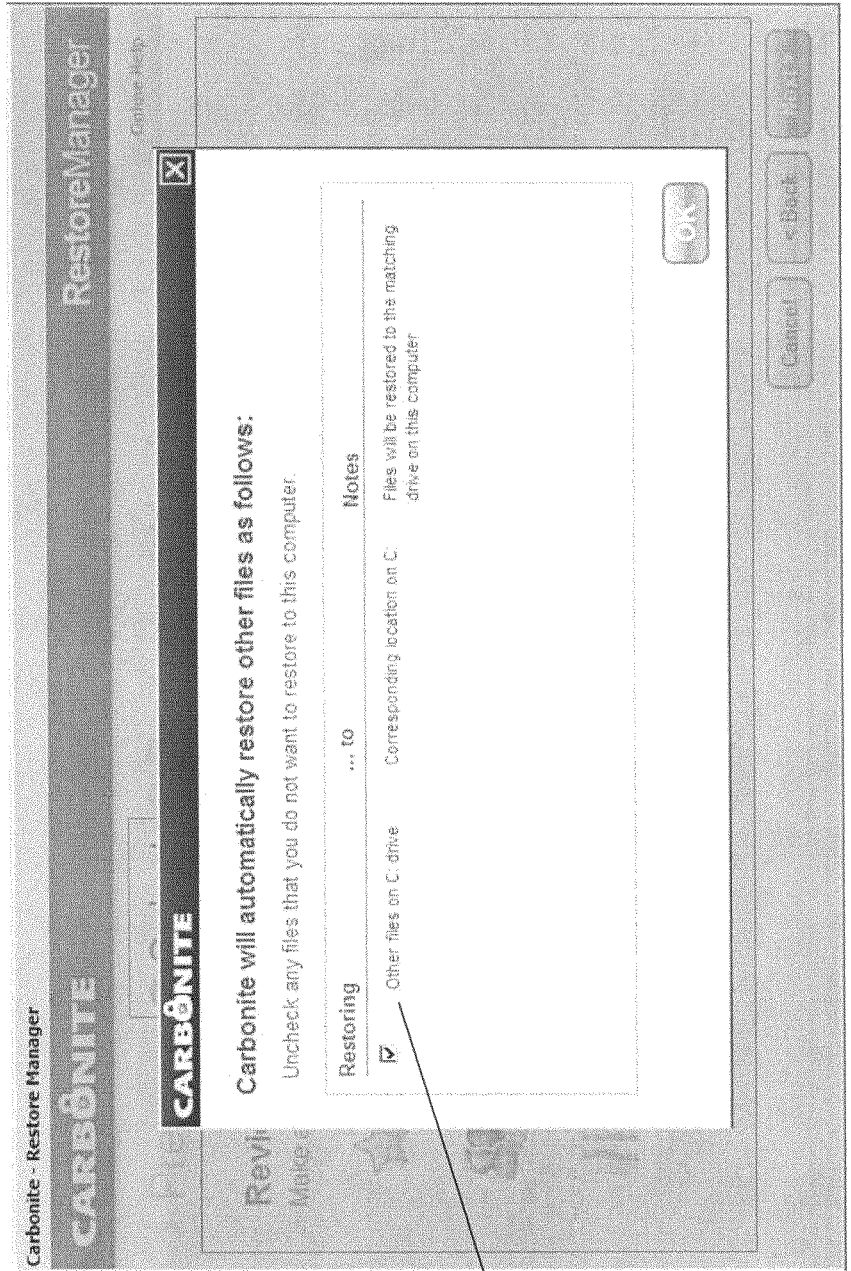

FIG. 12H illustrates a screen shot of an interface 1200h allowing the user to review and change selections made in user interfaces 1200b-1200g and to start restoring the user data to the current client device. For example, by clicking on a hyperlink 1295, the user can view or change the two files the user selected to restore first. The user can also view or change the mappings of user accounts by clicking on hyperlink 1285. The user can click on a hyper link 1290 to view and/or change options related to files that do not correspond to any user accounts. FIG. 12I displays a user interface 1200i allowing the user to view information related to such files. As shown in the user interface 1200i, other files on "C:\" drive are selected to be restored to a corresponding location on "C:" drive of the current client device. For example, a folder "C:\Helen" on the backed up device may not correspond to any domain or local user on the backed up device. As a result, the "Helen" folder will be restored to "C:\" drive of the current client device. As illustrated in the user interface 1200*i*, the user can unselect a grouping of files 1297 such that files on "C:\" drive not matching to any user accounts will not be restored to the current client device. In some embodiments, if a drive from the source client device does not exist on the current client device or is not writeable, the client restore management module 830 can determine another location into which files will be restored. In other embodiments, the client restore management module 830 allows for a drive on the source client device to be skipped from restoring (e.g., the drive on the source client device is still accessible rendering the restoration of those files undesirable).

Figure 13A:
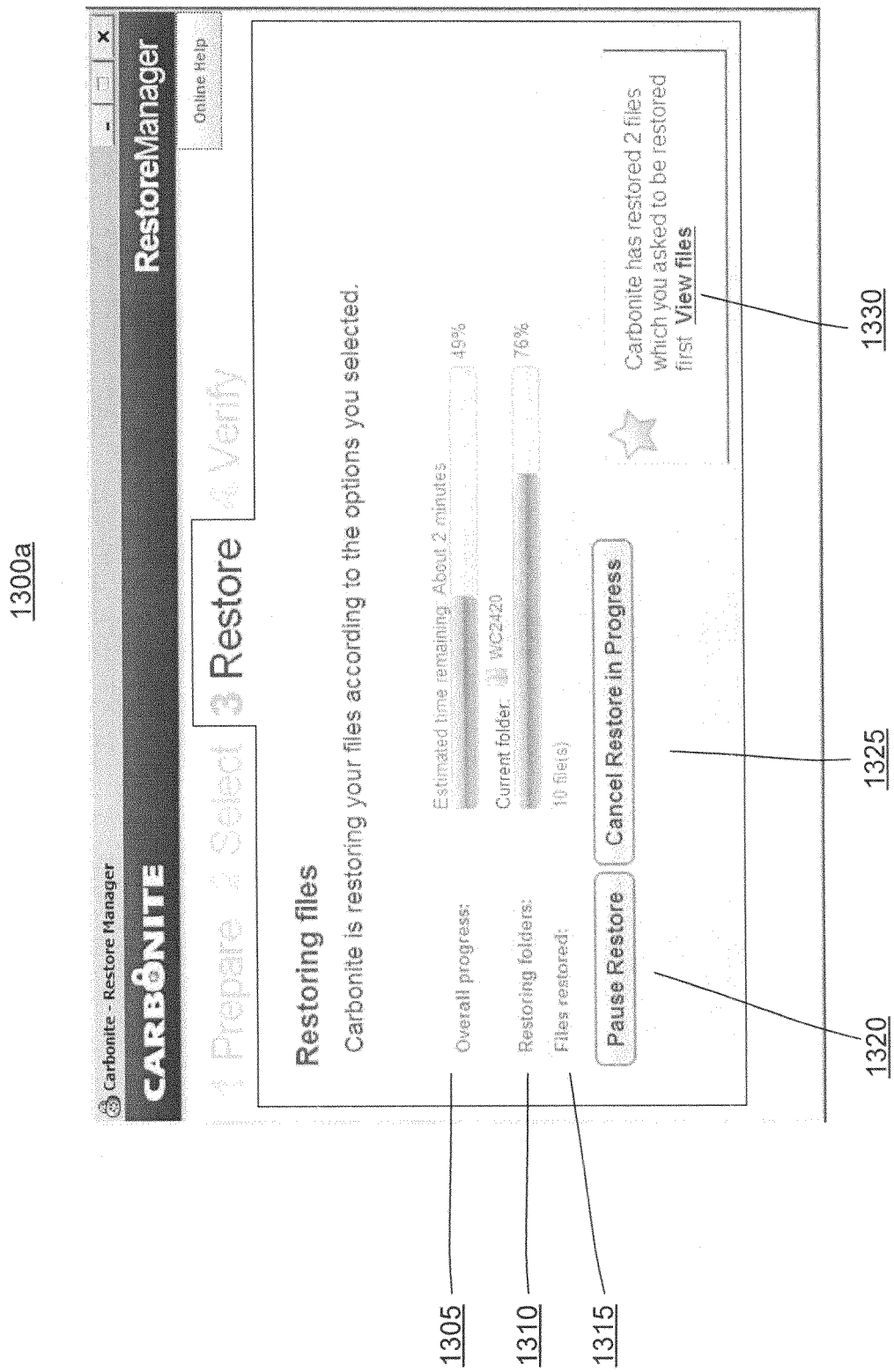

FIG. 13A illustrates a screen shot of an interface 1300*a* displaying status of the restore process. An overall progress bar 1305 indicates estimated time remaining until the restore process is completed. A current folder progress bar 1310 indicates estimated time remaining until the restore of a current folder being restored is finished. A files restored indicator 1315 displays a total number of files that have been restored thus far. The user interface 1300*a* can display a hyperlink 1330 to files that have already been restored (e.g., files selected to be restored first). The user can pause the restore process by clicking on a pause button 1320. When the user chooses to pause the restore process, the user may be prompted for a period of time the user wants to pause the restore process (e.g., 10 minutes, 2 hours, etc). The restore process will automatically resume restoring after the selected period of time lapses. The user interface 1300*a* may display a button allowing the user to immediately resume the restoring process (not shown). In some embodiments, by pausing the restore process, the user will lose any progress made on restoring the current file. In these embodiments, when the restore process resumes, it will start restoring the current file again.

Figure 13B:
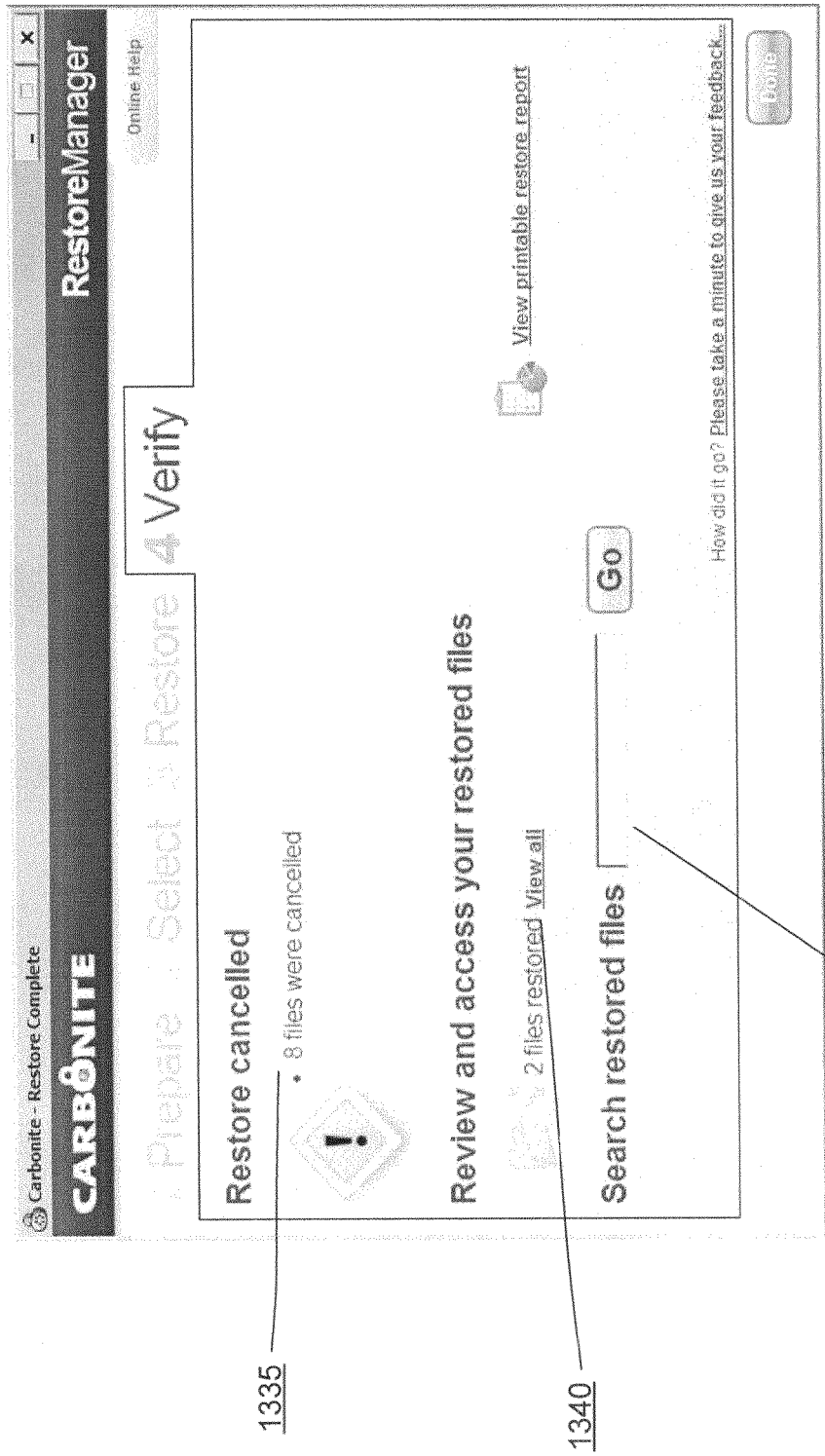

The user can also cancel the restore process already in progress by clicking on a cancel button 1325. FIG. 13*b* illustrates an exemplary interface 1300*b* displaying to the user a summary of progress made by the restore process before the user cancelled the restore process. As shown, the user interface 1300*b* displays a number of files 1335 that were not restored. A hyperlink 1340 allows the user to view the files that were restored before the user cancelled the restore process. The user can search for the files that were successfully restored by entering full or partial file name into a search textbox 1345.

Figure 13C:
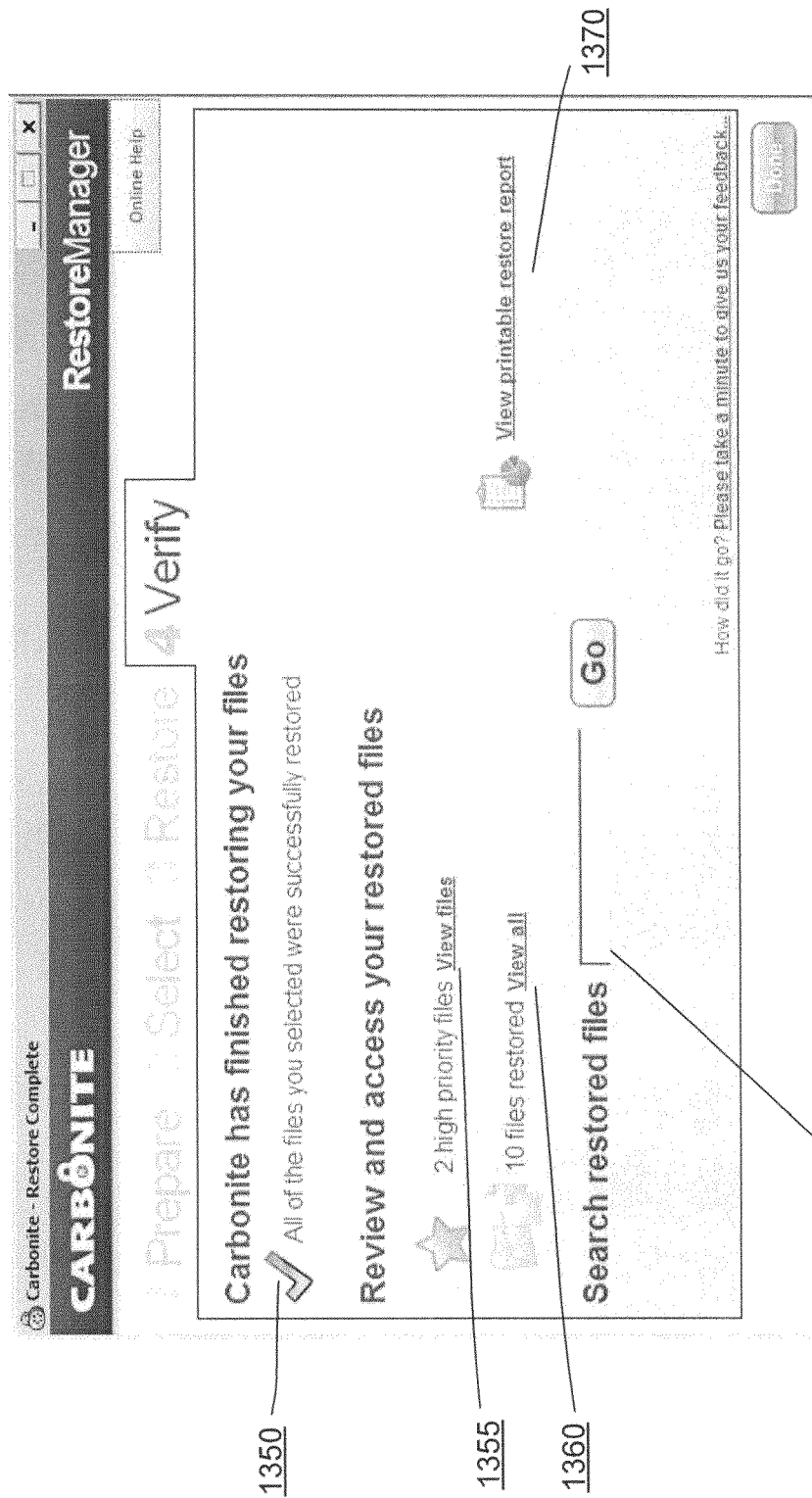
Figure 13D:
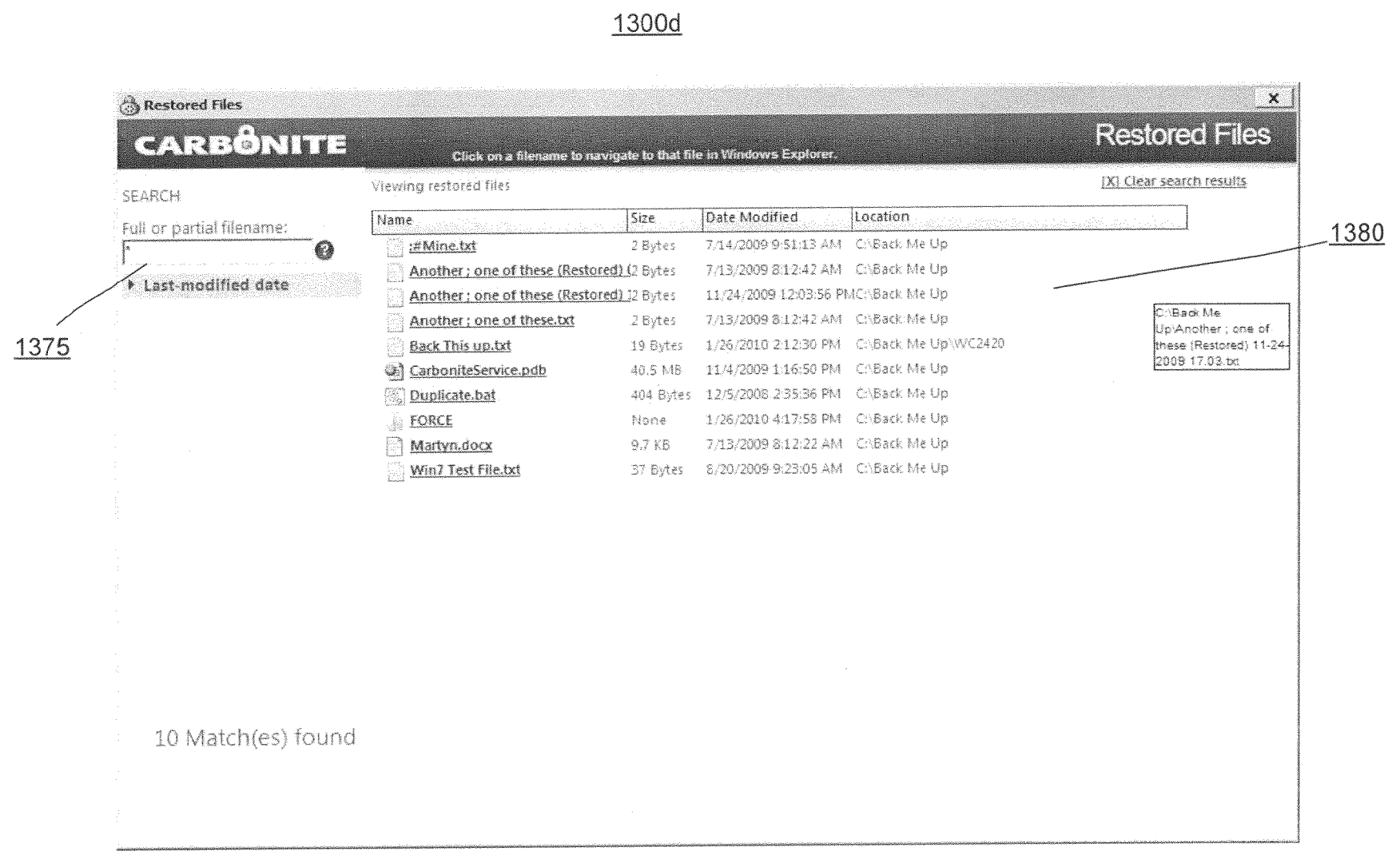

FIGS. 13C-13E illustrate exemplary interfaces providing the user with a summary of the restore files or folders. FIG. 13C illustrates a screen shot of an interface 1300*c* providing the user with the number of files restored, and the number of high priority files restored. The user is able to view these files by clicking on hyperlinks 1355 and 1360. The user can search through the restored files by entering search criteria into a text box 1365. For example, as illustrated in FIG. 13D, a user interface 1300*d* allows the user to search for all files successfully restored by entering "*" into a search text box 1375. A restore files panel 1380 displays to the user a list of files and/or folders satisfying the search criteria. As shown, the restore files panel 1380 displays name, size, last date the file or folder was modified, and location information. The user interface 1300*d* advantageously allows the user to quickly access any of the files displayed in the restore files panel 1380 by clicking on the file name hyperlink.

In some embodiments, the user interface 1300*c* can display information regarding problems incurred during the restore process (e.g., number of files that were not restored, number of files that were restored to a different location, etc.). The user may be able to view the files that couldn't be restored along with reasons for the unsuccessful restore. In other embodiments, files or folders may be saved to a different folder on the current client device (e.g., restore process may not have permission to save files to certain folders). For example, a Microsoft Word document was stored on a "C:\Back Me Up" folder on the backed up client device. In this example, the restore process may not have access to the "C:\Back Me Up" folder on the current client device and will restore the word file to a new location (e.g., "C:\Restore Backup\Back Me Up" on the current client device.

The user can also view a printable restore report by clicking on a hyperlink 1370. FIG. 13E illustrates a user interface 1300*e* displaying an exemplary restore report. The user interface 1300*e* includes an overview panel 1385 displaying the number of files restored, the total size of the restored files and folders (e.g., 80 MB). The user can view details about the file restoration by clicking on a hyperlink 1395. The user interface 1300*e* includes a file details panel 1390 displaying a listing of files or folders restored during the restore process, as well as information regarding the location of the files on the backed up client device and the current client device. In other embodiments, the restore report can display additional information regarding the restore process. For example, the restore report can include information regarding each individual file such as file size, last backup date, last modified date, user account that the file is associated with, etc. The restore report can include the total amount of time that the restore process took to complete. In other embodiments, the restore report can include information regarding problems incurred by the restore process.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component, One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium, Computer-readable media can be non-transitory in nature and can include both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for restoring backed up user data, the method comprising:
   receiving, by a restore manager executed by a client device having a first operating system, a user selection for restoring backed up user data to the client device comprising a user selected order for restoring files;
   receiving, by the restore manager, backed up user data from a server based on the user selection and according to the user selected order, the backed up user data comprising a file and a first file location of the file on a source device having a second operating system;
   determining, by the restore manager, a second file location for the file in the received backed up user data based on the user selection and the first operating system of the client device, responsive to the first operating system being different from the second operating system; and
   storing, by the restore manager, the file in the second file location.

2. The method of claim 1, wherein the user selected order includes a file to restore first.

3. The method of claim 1, wherein the user selected order includes a file type schedule.

4. A client device, comprising:
   a processor executing a first operating system and a restore manager that when executed by the processor, causes the client device to:
   receive a user selection for restoring backed up user data to the client device comprising a user selected order for restoring files;
   receive backed up user data from a server based on the user selection and according to the user selected order, the backed up user data comprising a file and a first file location of the file on a source device having a second operating system; and
   determine a second file location for the file in the received backed up user data based on the user selection and at least one parameter associated with the client device comprising the first operating system of the client device, responsive to the first operating system being difference from the second operating system, and
   store the file in the second file location.

5. The client device of claim 4, wherein the user selected order includes a file to restore first.

6. The client device of claim 4, wherein the user selected order includes a file type schedule.

7. The client device of claim 4, wherein the at least one parameter further comprises a mapping of one or more users of the source device associated with the backed up user data to one or more different users of the client device.

8. The client device of claim 7, wherein the restore manager is further configured to create a user account for a new user, responsive to the mapping comprising a mapping of one or more users of the source device associated with the backed up user data to the new user.

9. The client device of claim 7, wherein the restore manager is further configured to map a user of the source device to a user of the client device with a non-matching user name.

10. The client device of claim 7, wherein the restore manager is further configured to map a domain user of the source device to a local user of the client device with a name matching the domain user name of the domain user.

11. The client device of claim 7, wherein the restore manager is further configured to map a user of the source device to a user of the client device with a phonetically matching name.

* * * * *